(12) United States Patent
Schuerman et al.

(10) Patent No.: US 12,710,286 B2
(45) Date of Patent: Aug. 18, 2026

(54) DIGITAL MAP DATA WITH ENHANCED FUNCTIONAL SAFETY

(71) Applicants: TomTom Global Content B.V., Amsterdam (NL); TomTom International B.V., Amsterdam (NL)

(72) Inventors: Cornelis Pieter Schuerman, Veldhoven (NL); Roland Alaric Ian Rosier, Hoogeloon (NL); Edward van de Vorst, Eindhoven (NL); Paul Lieverse, Eindhoven (NL)

(73) Assignees: TomTom Global Content B.V., Amsterdam (NL); TomTom International B.V., Amsterdam (NL)

( * ) Notice: Subject to any disclaimer, the term of this patent is extended or adjusted under 35 U.S.C. 154(b) by 601 days.

(21) Appl. No.: 17/801,749

(22) PCT Filed: Feb. 25, 2021

(86) PCT No.: PCT/EP2021/054682
§ 371 (c)(1),
(2) Date: Aug. 23, 2022

(87) PCT Pub. No.: WO2021/170718
PCT Pub. Date: Sep. 2, 2021

(65) Prior Publication Data

US 2023/0358568 A1 Nov. 9, 2023

(30) Foreign Application Priority Data

Feb. 25, 2020 (GB) ...................................... 2002612

(51) Int. Cl.

| | |
|---|---|
| ***G01C 21/00*** | (2006.01) |
| ***G06F 16/29*** | (2019.01) |
| ***H04L 9/32*** | (2006.01) |

(52) U.S. Cl.
CPC ..... *G01C 21/3881* (2020.08); *G01C 21/3878* (2020.08); *G01C 21/3885* (2020.08);
(Continued)

(58) Field of Classification Search
CPC ............ G01C 21/3881; G01C 21/3878; G01C 21/3885; G06F 16/29; H04L 9/3247; H04L 2209/84
(Continued)

(56) References Cited

U.S. PATENT DOCUMENTS

2010/0070772 A1* 3/2010 Nakamura ............ H04L 63/123 713/176
2011/0054716 A1* 3/2011 Stahlin .................... G01S 19/45 701/1

(Continued)

FOREIGN PATENT DOCUMENTS

CN 107306184 A 10/2017
DE 102013200181 A1 * 7/2014 ......... G01C 21/3881

(Continued)

OTHER PUBLICATIONS

International Search Report dated Nov. 5, 2021 for International patent application No. PCT/EP2021/054682.

(Continued)

*Primary Examiner* — Fadey S. Jabr
*Assistant Examiner* — Ahmed Alkirsh
(74) *Attorney, Agent, or Firm* — Whitmyer IP Group LLC

(57) ABSTRACT

Disclosed herein is a technique for the generating and provision of digital map data that is safe and reliable. The technique enables the verification of the digital map data in a map-client using a simple and efficient data structure to check the correctness of the map data before in-vehicle delivery to components that rely on this map data.

20 Claims, 8 Drawing Sheets

(52) U.S. Cl.
CPC ............ *G06F 16/29* (2019.01); *H04L 9/3247* (2013.01); *H04L 2209/84* (2013.01)

(58) Field of Classification Search
USPC .......................................................... 701/409
See application file for complete search history.

(56) References Cited

U.S. PATENT DOCUMENTS

| | | | | |
|---|---|---|---|---|
| 2012/0173606 | A1 * | 7/2012 | Becker ............... | G01C 21/3667<br>709/203 |
| 2013/0321450 | A1 * | 12/2013 | Hultquist ............. | G01C 21/367<br>345/619 |
| 2013/0346743 | A1 * | 12/2013 | Dixon ..................... | H04L 9/006<br>713/156 |
| 2014/0149032 | A1 | 5/2014 | Barrett et al. | |
| 2014/0344296 | A1 * | 11/2014 | Chawathe ........... | G06F 16/9537<br>707/769 |
| 2016/0358112 | A1 * | 12/2016 | Verosub ................ | G01C 21/36 |
| 2019/0028279 | A1 * | 1/2019 | Tsuda ........................ | H04L 9/08 |
| 2019/0325737 | A1 * | 10/2019 | Moustafa ........... | G01C 21/3881 |
| 2020/0410783 | A1 * | 12/2020 | Duarte Gelvez .... | G07C 5/0841 |
| 2021/0049901 | A1 * | 2/2021 | Young ..................... | H04W 4/46 |

FOREIGN PATENT DOCUMENTS

| | | | | |
|---|---|---|---|---|
| JP | 2004012382 | A | 1/2004 | |
| JP | 2019106608 | A | 6/2019 | |
| KR | 101108257 | B1 | 1/2012 | |
| WO | 2011099076 | A1 | 8/2011 | |
| WO | 2011102164 | A1 | 8/2011 | |
| WO | 2015048307 | A1 | 4/2015 | |
| WO | 2017038888 | A1 | 3/2017 | |
| WO | 20180207424 | A1 | 11/2018 | |
| WO | WO-2018207424 | A1 * | 11/2018 | ............... H04L 9/32 |

OTHER PUBLICATIONS

Ying S, Li, QQ; "Study on data incremental updating method of navigation digital map," 2008 Proceedings of Information Technology And Environmental System Sciences; ITESS 2008; Dec. 31, 2008; Abstract; 1 Page.

Yue Yao; Wang Huan; Zhang Wei; "research on key technologies of digital map data quality inspection system;" Surveying and Mapping; Dec. 31, 2016; 8 Pages.

Xu Yifei, Li Bo; "design and implementation of an airborne 3D digital map module;" "Aeronautical Computing Technology;" vol. 48, Issue 5; Sep. 30, 2018; 3 Pages.

* cited by examiner

DIGITAL MAP DATA WITH ENHANCED FUNCTIONAL SAFETY

RELATED APPLICATIONS

The present application is a national stage application from, and hereby claims priority to, pending international application no. PCT/EP2021/054682, which was filed on 25 Feb. 2021. The present application also claims priority to United Kingdom application no. 2002612.6, which was filed on 25 Feb. 2020, and to which international application PCT/EP2021/054682 claims priority. Both of these applications are incorporated herein by reference.

FIELD OF THE INVENTION

The present invention relates generally to methods and systems for providing digital map data, e.g., that is being transmitted from a cloud server environment, to a map-based application executing on-board a vehicle. Embodiments relate to methods and systems for providing such digital map data with enhanced functional safety. In particular, embodiments of the present invention relate to techniques for verifying the integrity (and authenticity) of high definition (HD) map data, e.g., before it is provided for use in advanced/autonomous driving applications. Embodiments also relate to methods of operating a client application for such contexts.

BACKGROUND

Navigation systems use digital maps for supporting a driver to reach a desired destination. Such digital maps typically consist of a set of plural navigable segments (or 'arcs') and nodes connecting the road segments together to form a suitable graph representation of the navigable (e.g. road) network. The digital map elements have associated navigation cost parameters that can be used in determining a cost for a path to a destination, e.g. for route planning purposes. Digital maps supporting basic road-level navigation and route-planning services (only) are sometimes referred to as Standard Definition maps (SD maps).

In order to provide more advanced autonomous driving (AD) and advanced driver assistance system (ADAS) functionality, it is necessary to use so-called High Definition maps (HD Maps) providing a highly detailed and precise three-dimensional view of both the road and lane geometry. Thus in addition to the arcs and nodes defining the road geometry, such HD maps also include a lane model describing the lane markings, lane center lines, road boundaries, and so on. A typical HD Map thus comprises a set of arcs representing junction areas and lane groups and a set of nodes describing the connections between the arcs. Junction areas and lane groups describe the road surface from side to side (as well as along a direction of travel). A HD map in effect extends the range of view for a vehicle beyond the range of its local sensors and thereby enables smoother, safer and more efficient driving scenarios.

It will be appreciated that AD/ADAS applications may provide highly automated driving functionality, the safety of which is critically reliant on receiving accurate and up-to-date HD map data reflective of the area of the navigable (e.g. road) network within which the vehicle is travelling. If the integrity or authenticity of such data being used by an AD/ADAS application to navigate a vehicle around the navigable (e.g. road) network is compromised this can therefore have serious (even fatal) consequences.

The digital map data is therefore 'safety critical' and its reliability must be ensured in order to meet the required regulatory standards for automated in-vehicle systems. For instance, it should be ensured that the data is not corrupted, e.g., during storage and/or transmission. Furthermore, security of the data is a prerequisite for safety and it must be ensured that the AD/ADAS application is protected against security threats. These aspects must therefore be considered when achieving functional safety for the AD/ADAS applications.

The functional safety of in-vehicle safety critical systems is generally realized by developing those in compliance with the ISO 26262 functional safety standard. The production of safety critical map data will be subject to the ISO 21448 standard for the safety of the intended functionality (SoTIF). Ensuring the reliability of such digital map data thus places certain requirements on the development of the map data delivery and distribution systems. However, it will be appreciated that due to the number of interfaces and functional components associated with a map distribution system, i.e. a map client (interface), such map client (interfaces) are functionally complex software components. Implementing map data delivery and distribution systems at the required functional safety levels can therefore be both labour-intensive and complex. Meeting the desired functional safety requirements for AD/ADAS applications thus typically involves a significant burden for the design, testing and support of the map delivery and distribution systems, with such complex implementations typically requiring increased processing and storage resource.

Digital map data for AD/ADAS applications is typically generated remotely, e.g. in a cloud server environment, by compiling suitable source data from one or more map data source(s), and then the map data is delivered from the cloud to vehicles requiring the map data. An in-vehicle distribution network then distributes the map data as required to the AD application requiring the map data (and/or to any other map-based applications executing on-board the vehicle).

To provide a more efficient delivery of the map data, it is known to represent the digital map as a plurality of map tiles, each map tile representing a portion of the overall map area and including data indicative of objects falling within the area covered by the map tile. For instance, a set of map tiles may be provided with different map tiles in the set representing the navigable network (e.g. road) in a different portion of the geographical area as a plurality of arcs connected by nodes. At least object data pertaining to the set of arcs and nodes defining the navigable (e.g. road) network in that area may thus be stored for a map tile. This may include object data defining characteristics of the arcs/nodes themselves (e.g. defining the road/lane geometry in that area), and also data for objects associated with the arcs/nodes, e.g. traffic signs, and so on. Of course any other suitable information that may desirably be included in the map may be stored for a tile. When the map-based application requires information concerning a certain feature, or location, within the navigable (e.g. road) network, a request for the relevant map tile(s) can then be issued to obtain the appropriate map (i.e. object) data.

Such requests are typically handled by a suitable client application (interface) executing on the vehicle. The client application (interface) receives the map tile(s) and then processes these accordingly to extract the relevant map data. The client application (interface) can then distribute the map data to any, e.g., AD/ADAS applications, as desired. This has typically been done with reference to a suitable "horizon" generated by considering the predicted upcoming driving path, e.g. based on the current vehicle position, the driving conditions, and road data. The horizon can then be associated with a set of map tiles representing a sub-map in the area leading up to the horizon onto which dynamic (e.g. sensor) data can be added, e.g., to implement the AD/ADAS functionality. Typically a plurality of horizons are generated for a corresponding plurality of predicted driving paths to be able to better account and adjust for the vehicle deviating from any one of the predicted driving paths.

The sub-map data associated with the horizon(s) can be provided to the AD/ADAS applications, e.g., according to an Advanced Drive Assistance Systems Interface Specification (ADASIS) protocol. For instance, the new ADASIS V3 standard is often used for in-vehicle HD map distribution. ADASIS V3 consists of a horizon provider, a horizon reconstructor, and the ADASIS V3 protocol used between provider and reconstructor(s). The ADASIS V3 protocol typically uses an in-vehicle network, e.g. Ethernet. Once the sub-map data is provided to the AD/ADAS application, the application can then plan a predicted driving strategy e.g. by comparing the map data within the horizon with dynamic sensor data, and so on, in the usual fashion.

Such systems thus allow for the delivery of map data directly to the vehicle. However, when the map data is provided as a set of tiles there can be still be difficulties in ensuring the functional safety of the map data that is being used by the AD/ADAS application. Furthermore, existing approaches for achieving functional safety may be relatively complex to implement, and it would be desirable to provide a more efficient client application (interface) capable of achieving the required functional safety.

The Applicants therefore believe that there remains scope for improved methods of providing map data whilst still meeting the desired functional safety requirements, e.g., for AD/ADAS applications.

SUMMARY

According to a first aspect of the present invention there is provided a method of verifying map data that is being transmitted from a remote server to one or more map-based application(s) executing on an electronic control unit (ECU) of a vehicle traversing a navigable network covered by a digital map, wherein the digital map is represented as a set of plural map tiles, each tile representing a particular geographical area including a portion of the navigable network, the method comprising:

- generating, at the server, a data structure for a map tile, wherein the data structure includes object data indicative of a set of one or more object(s) falling at least partially within the geographical area covered by the tile and/or within the geographical area covered by another one or more of the tile(s) representing the digital map,
- wherein, for at least one object in the set of one or more object(s) for which object data is included in the map tile data structure, associated security data is included within the map tile data structure along with the object data for the at least one object, the security data being usable for verifying the integrity of its associated object data; and
- transmitting the map tile data structure for the tile including the object data and associated security data from the server to a client application executing on one or more processing unit(s) of the vehicle.

The present invention relates generally to the generating and provision of digital map data and particularly to the provision of high definition (HD) digital map data suitable for advanced and/or autonomous driving applications. Especially for autonomous driving (AD) applications it will be appreciated that the map data is safety-critical and its reliability must therefore be ensured in order to meet the safety requirements for in-vehicle safety critical systems. Embodiments of the present invention thus relate to methods for verifying such digital map data, e.g. before it is distributed to, and used by, map-based applications executing on-board a vehicle. Furthermore, developing map-client interfaces capable of meeting the desired safety requirements may be challenging and intensive. Thus, embodiments of the present invention also relate to an efficient implementation of a map client application with an enhanced (e.g. ASIL-B) level of functional safety, as will be explained further below.

For instance, in embodiments of the first aspect of the present invention, a method for verifying digital map data at the "object level" is provided, that allows the individual map objects to be verified in an efficient manner, without significant additional storage and/or transmission overhead, even where the map data is packaged for transmission purposes into a number of map tile data structures, as will be explained further below.

It will be appreciated that such digital maps are typically complex data structures including roads, road lanes, junctions, traffic information, points of interest and many other types of information. Accordingly, in order to reduce the amount of data that must be stored locally to a vehicle running a map-based application and/or to reduce the bandwidth required for transmitting the map data to the vehicle, the overall area being represented by the digital map may be (and in the present invention is) divided into a plurality of smaller area regions for data storage purposes, such that the device need only retrieve data relating to regions relevant to its current position and/or predicted driving path. In the present invention the smaller area regions into which the overall area is divided into for mapping purposes are referred to as "tiles". However, it will be appreciated that other equivalent terms could be used, and that the term "tile" does not imply any particular restrictions on the shape or size of the regions into which the digital map is divided.

The use of such a tile-based approach may help provide a more efficient transmission and distribution of the map data from the various map data sources to the vehicles requiring the map data. For instance, an advantage of the tile-based approach is that it is possible to readily compile map data from different sources at the server (or at a plurality of servers) into a set of respective tiles, and then deliver or provide relevant map data, e.g. on a tile-by-tile basis, to vehicles requiring map data for the regions covered by the tiles. The tile data structure(s) can then be unpacked, e.g., by a suitable client application (interface) executing on one or more processor(s) on-board the vehicle in order to extract the desired (map) object data which can then be distributed to various map-based applications running within the in-vehicle environment, as required.

Part of ensuring the reliability of the map data, and enhancing the functional safety for applications relying on the map data, is being able to verify the integrity and authenticity of the data that is being delivered to the vehicle. To this end, the tile data structures may be (and in preferred embodiments are) digitally signed so that it can be checked that the tile data structure received by the client application (interface) matches what was transmitted from the original server(s). Thus, in embodiments, after the tile data structures been compiled at a first server, each tile data structure may then be digitally signed at the (or another) server before it is delivered to a vehicle. For example, this may comprise adding a digital signature, e.g. a 256 bytes SHA-2 digital signature, or similar, to each tile data structure. This approach allows for verification of the integrity and authenticity of the data at the tile level, i.e. the level at which the data is obtained from the server. Thus, when a tile data structure is transmitted from the server to an appropriate client application (interface) executing on the vehicle, before the client application (interface) attempts to use, or distribute, the map object data stored for the tile, the client application (interface) can check the digital signature to verify the integrity of the tile data structure. Of course, this tile-level verification need not use a digital signature and any other suitable verification techniques could also be used, as desired.

This tile-level verification is important, e.g. to confirm that the tile data structure has not been altered or corrupted during transmission. However, it will be appreciated that any end applications requiring the map data (which may be AD applications or advanced driver assistance system (ADAS) applications running on an ECU of the vehicle, but also may include any other navigation or geo-spatial aware applications executing within the in-vehicle environment) typically do not use the map data at tile level, and instead require access to the object data that can be extracted from such tile data structures. The client application (interface) thus acts in conjunction with, or as part of, an in-vehicle map distribution network to extract from the tile data structures the relevant object data at a level that can then be used by the map-based applications, and provide such data to the map-based applications. For instance, the client application (interface) may provide the map (object) data directly to the map-based (e.g. AD/ADAS) application. Alternatively, the client application (interface) may provide the map (object) data to, e.g., a horizon provider which then passes the map data to the map-based applications. Other arrangements would of course be possible.

Thus, it will be appreciated that being able to verify the authenticity/integrity of the data at tile level does not by itself ensure that the map (object) data that is ultimately to be provided to the map-based application(s), and potentially used thereby, e.g., for autonomously driving the vehicle, is reliable and additional safety measures may therefore be required in order to ensure that the relevant functional safety criteria for the application(s) are met. For instance, whilst verifying the tile data structures may allow the authenticity of the object data contained within the tile data structures to be verified (i.e. by confirming that the data has come from a reputable source, e.g. a verified server), it has been recognised that the object data itself may still be altered during transmission and/or in storage and so the integrity of the object data should desirably be verified before it is provided to the map-based applications, e.g. in case the data has been somehow corrupted or altered within the in-vehicle map distribution network, and/or whilst it is being held locally, e.g., in a cache associated with the client application (interface). Further, it is desirable that this data can be verified whilst limiting the software/hardware complexity of the client application (interface), and limiting the amount of additional data that needs to be distributed in the vehicle.

Accordingly, embodiments of the present invention propose that security data is provided on a per object level (preferably in addition to the tile-level verification described above), at least for some of the objects within a particular tile data structure. That is, in preferred embodiments, in addition to providing authentication and/or integrity verification at a tile-level, i.e. the level at which the data is accessed from the server by the client application (interface), the present invention (also) provides security data at the level of the meaningful entities that are ultimately used by the map-based application, i.e. the objects for which data is stored in the tile data structures. The associated security data for an object is usable (e.g. by the client application) to verify the integrity of the object data itself. Thus, the tile data structure includes for at least some of the objects for which object data is stored, associated security data for verifying the integrity of the object data. In this way it is possible to readily verify object data for objects of interest both prior to its in-vehicle distribution and prior to its use by any in-vehicle applications and to ensure that the relevant functional safety criteria can be met.

In particular, this means that it can be ensured that the object data has not been, and is not, corrupted after it has been received, e.g. when storing or accessing the object data from a local data store accessible by the client application (interface). Further, in preferred embodiments this is done with relatively little additional processing overhead, and, e.g., without requiring that the entire map data distribution system must be developed at the required safety level, as will explained further below.

The present invention also extends to a map delivery (or production) system for performing such methods. Thus, according to a second aspect, there is provided a map delivery system comprising at least one remote server that is communication with a client application (interface) executing on one or more processing unit(s) of a vehicle travelling within a navigable (e.g. road) network covered by a digital map, wherein the digital map is represented as a set of plural tiles, each tile representing a particular geographical area including a portion of the navigable (e.g. road) network, wherein the at least one remote server is configured to: generate a data structure for a map tile, wherein the data structure includes object data indicative of a set of one or more object(s) falling at least partially within the geographical area covered by the tile and/or within the geographical area covered by another one or more of the tile(s) representing the digital map, wherein, for at least one object in the set of one or more object(s) for which object data is included in the map tile data structure, associated security data is included within the map tile data structure along with the object data for the at least one object, the security data being usable for verifying the integrity of its associated object data; and transmit the map tile data structure for the tile including the object data and associated security data from the server to a client application executing on one or more processing unit(s) of the vehicle.

This second aspect of the present invention can and preferably does include any one or more or all of the preferred and optional features of the invention described herein in respect of the first aspect in any of its embodiments, as appropriate. For example, even if not explicitly stated, the system may, and in embodiments does, comprise means for carrying out any step or steps described in relation to the method herein in any of its aspects or embodiments, and vice versa.

In embodiments the digital map comprises a plurality of levels (or layers) with each level being divided into a plurality of tiles, in the manner described above. That is, the tiles may be arranged into a plurality of respective levels and each map tile may thus contain object information for its associated level of the map. For instance, different levels of the map may be used to store different types of object data. Each map level may thus contain a sub-set of the available map information. For example, a base level of the map may contain the basic road geometry information (e.g. a set of arcs and nodes defining the navigable (e.g. road) network). Different types of object and/or attributes may then be stored at progressively higher levels in the map. This structure advantageously allows the map based application(s) requiring the map data to extract map data from any of the levels such that it is possible to extract (only) the relevant information for a map based application, depending on what information is required by the application.

The tiles representing the map (or more particularly a level in the map) may generally take any suitable form, as desired. The tiles may have either regular or irregular shapes. For instance, in some cases the tiles may follow regional boundaries (e.g. countries, states, provinces), and may therefore have irregular shapes and sizes. In other cases, and more typically, the tiles into which the overall area is subdivided comprise an array of tessellated units of regular shape. Typically the tiles may be rectangles (e.g. squares) although other shapes may suitably be used such as pentagons, triangles, and so on, including combinations of the same. All of the tiles for the map may have the same size. However in embodiments it is also contemplated that the tiles may have variable sizes. This may be the case either for tiles within a single level of the map, or for tiles across different levels. For instance, in the latter case, rather than storing different types of data at different levels of the map (or in addition to this), the different levels may be used to store map data at different levels of granularity. In particular, providing variable tile sizes, whether this is within a single level of the map, or across multiple map levels, may allow for a data-dependent sizing of the tiles wherein the physical sizes of the tiles are selected, e.g., such that each tile data structure has approximately the same data size. This may help to facilitate a more efficient transmittal of the map data, and a more effective use of the available tiling resource (and associated data allowance for the tiles), especially where the density of map data changes significantly. Thus, for relatively sparse (e.g. rural) areas, where there may be relatively little map content of interest, the area may be represented using relatively larger tiles. On the other hand, relatively smaller tiles may be used to represent denser (e.g. urban) areas where there is likely to be a greater amount of map content that needs to be stored.

Each tile therefore represents and is associated with a certain geospatial area within the overall area that is covered by the map. For each tile, a suitable data structure can then be generated describing any objects falling within the associated area of the tile and that should be included within the map. The objects for which data is stored for the tile may comprise any suitable objects that may desirably be included in the map. The objects may thus represent real-world objects, such as road elements, junctions, points of interest, traffic signs, traffic lights, speed cameras, etc. However, digital map data also comprises other types of information objects, which may be used to encode map information. For example, an object may be used to identify a location where a speed limit changes, or to provide a virtual node between road elements. The objects for which data is stored for a particular tile may comprise any such objects. It will also be appreciated that the data stored within a tile data structure is not limited to data indicative of "objects" and may include any other suitable data, e.g., that might desirably be included into the map. For example, in embodiments, the tile data structure also includes data indicative of any attributes associated with the navigable (e.g. road) network such as speed limits. Any such attribute data may also be stored alongside suitable security data, in a similar manner as described herein for the object data.

It will be appreciated that the core information for the HD map for which the reliability must be ensured is the sets of arcs and nodes representing the junction areas and lane groups associated with the navigable (e.g. road) network. The objects for which object data is stored for a tile will therefore typically at least include object data for a set of arcs and nodes representing the road network in the region of the map that is covered by the tile. Thus any references to objects or object data herein may be understood in embodiments to refer to (at least) arc and/or node data, or object data that is associated with arcs/nodes.

It will be appreciated that while dividing the digital map into smaller area tiles in the manner described above may be useful for reducing storage requirements, this approach will introduce tile boundaries that need to be resolved. For instance, as it is generally possible for people/vehicles to move from one tile to an adjacent tile, there will be map objects (roads, junctions, points of interest, etc.) that span across tile boundaries. That is, at least some of the map objects may (and at least some typically will) include elements that extend across multiple tiles. In such cases, to avoid having to split the object data, the object data may be (and in some preferred embodiments is) duplicated and stored separately in each of the tiles over which the element extends. This may be beneficial since it avoids the need to attempt to 'stitch' objects appearing in different tiles together across the tile boundaries. In this case, security data is stored along with the object data for each of the relevant tiles. However, other approaches for storing such data would of course be possible. For instance, in another preferred embodiment, the object data for a particular object may be stored in a single tile data structure (only), even where the object represents an element that extends across multiple tiles, such that the object data is then stored (directly) in a single tile (only). For any other tiles within which the object at least partially falls inside, a suitable reference, or pointer, is then generated and stored pointing to the tile data structure including the relevant object data. Thus, in some embodiments, when an object extends across multiple adjacent tiles in a particular level of the map, the object data may be stored in a first tile (only), and the other tiles within which the object falls reference the first tile. Similar references may be made between tiles at different levels, e.g. such that object data appearing in a tile at a first level is stored for a tile at a second level, with a suitable reference to the second-level tile then being included in the first-level tile.

Thus, it will be appreciated that the data indicative of an object that is stored in a particular tile data structure may be the object data itself (i.e. data that is directly indicative of the object), or may be data that is only indirectly indicative of the object, e.g. in the form of a suitable pointer to another tile data structure where the object data is stored. Correspondingly, a tile data structure may therefore include data not only for objects falling within the area covered by its respective tile, but also for objects falling at least partially inside the area of another of the tiles (which may e.g. be an adjacent tile in the same level of the map as the tile in which the data is stored, or a tile on another level). In this case the security data for the object may also be stored only in the data structure for the first tile, i.e. the tile within which the object data is stored.

However, various other arrangements for storing the data indicative of the objects for a tile would in principle be possible. Indeed, in general, the data indicative of the objects for a particular tile may be stored in any suitable way. For instance, the data may be indicative of the object in any fashion, and this does not imply any particular form of relationship between the data and the object so long as there is some suitable association that allows the relevant object information to be extracted and used appropriately. The object data may be stored either directly or indirectly in a data structure for a tile. Further, the data may be stored either in a compressed or uncompressed (raw) format, as desired.

The security data associated with an object may take any suitable form, as desired. Various techniques for verifying the integrity and/or authenticity of data are well established and may be used, as desired. In particularly preferred embodiments, the security data comprises a 64-bit truncated SHA-256 hash value (or hash 'code'). This has been found to provide appropriate trade-off between reliability and the implications for storage space and cellular network usage. Security hashes can also be readily implemented at the desired functional safety levels. For instance, security data could also be provided in the form of, e.g., a digital signature. However, checking a digital signature is more complicated than (re)calculating a hash value and therefore more difficult to implement especially when the system is to be designed according to a higher functional safety level (e.g., at ISO 26262:2018 ASIL-BASIL-B level, or above). Thus, in embodiments, for at least some of the objects (and preferably for each of the objects) in a tile data structure for which security data is stored, the security data may be provided in the form of a security hash (value) for the object data that is calculated at the server. The object data may thus be verified at the client application (interface) by the client application (interface) re-calculating the hash value based (at least) on the object data and comparing this to the hash value contained within the security data. In preferred embodiments, map tile metadata is also transferred separately from the map data. The metadata may include, e.g., version and format information for the tile and/or the map. In this case, the hash associated with the object data for an object is preferably calculated based on the object data and also the metadata for the tile within the object data is stored. The metadata is preferably protected by hashes too. That is, a map tile preferably has associated metadata that has its own hash.

However other arrangements for authenticating the object data and metadata would of course be possible and it is not necessary to use security hashes. For instance, it will be appreciated that the security data may in other embodiments alternatively, or additionally, comprise any suitable error detecting code (e.g. a minimum distance code, hash code, checksum code, parity code, cyclic redundancy check, etc.), error correcting code (block code, convolutional code, Hamming code, Viterbi code, etc.), message authentication code, digital signature, or the like. Further, any combination of these techniques may be applied in embodiments.

As suggested above, the security data may be stored for each and every object for which object data is stored for a particular tile. Security data may be stored individually for each object, i.e. a one-to-one correspondence. Alternatively, security data may be associated with, and stored for, object data for a set of one or more, e.g. plural, objects, e.g. a set of objects that may be typically accessed together. However, it is not necessary to store security data for every piece of object data included in a tile data structure, and in some embodiments, security data is stored for less than all of the objects within a particular tile data structure. For example, it may be that security data is only stored for certain, e.g., safety-critical objects. This might involve only storing security data for objects in a base level of the digital map. Or, different types of security data may be stored for different types of objects, e.g. in different levels of the map, to provide different levels of verification.

For example, it will be appreciated that road geometry elements such as arcs (lane groups, junction areas) and nodes are the essential elements of the HD map and the core safety-critical entities for HD map applications. Security data should therefore be (and is) stored for at least these objects. Thus, in embodiments, map tiles may represent the navigable network in a portion of the geographical area as a plurality of arcs connected by nodes, wherein each arc and node of a tile have object data and security data (e.g. a hash value) associated therewith. For example, in a particularly preferred embodiment, a hash value (or hash code) is calculated at the server for each arc (e.g. lane group or junction area) and node for which data is being stored and the hash value is then added into the tile data structure along with the object data describing the arc/node. The hash value preferably covers not only the object data but also any associated metadata for the tile within which the object is stored. Thus, each arc and node for which object data is stored for a tile has an associated hash value and this is preferably (calculated) based not only the object data but also the associated tile metadata for the tile containing the object data. When the data structure including the object data and hash value for the arc/node is unpacked at the client application (interface), the hash value for the arc/node can then be re-calculated by the client application (interface) based on the received object data (and preferably also the associated metadata (sent separately), where the hash value is also based on this), and the re-calculated hash value then compared with the original hash value calculated at the server in order to verify the integrity of the object data. In embodiments, the tile metadata that is transferred separately from the map data is also protected by hashes. The client application (interface) may thus perform a similar calculation and compare on the tile metadata to check the integrity of the metadata before it is used to check the integrity of the object data in the tile. Thus, the method generally comprises the client application unpacking the tile data structure to extract object data indicative of one or more object(s) for which data is stored in the tile data structure; and the client application using the associated security data to verify the integrity of the extracted object data.

Various other arrangement would of course be possible, however, e.g. depending on the type of security data that is provided.

For other less critical objects it may not be necessary to store security data. Nonetheless, in preferred embodiments, security data is also stored for other objects in the map. For instance, in a preferred embodiment, objects at higher levels in the map, which may be speed restrictions, driving restrictions, etc., associated with particular arcs and nodes, get an associated hash covering the associated object data and an index reference to the arc or node that the object data is associated with. Note that lane groups and junction areas may contain "key or index references" to their two associated nodes. Since they are then covered by the hashes of lane groups and junction areas, the integrity of any sub-map can be assured.

When the object data has been suitably verified, e.g. using its associated security data, e.g. in the manner described above, it can then be used, and distributed, appropriately to any map-based applications requiring the map data. On the other hand, when the object data cannot be verified, i.e. because the security check fails, a suitable integrity error signal may be generated. Alternatively, or additionally, when the verification fails, the client application (interface) may make another attempt to obtain the object data. For example, multiple attempts may be made until a timeout criterion has been met (e.g. a certain time period has elapsed, or a certain number of attempts have been made), at which point a suitable integrity error signal may be generated. The integrity error signal is preferably then communicated to the map-based application(s) and acted on accordingly. For instance, when the map-based application is an autonomous driving application (or wherein the map-based application is a vehicle horizon provider that in turns provides map data to an autonomous driving application), when an integrity error message is generated, the autonomous driving application may then operate the vehicle in a safe mode and/or bring the vehicle to a safe stop.

The tile data structures for the tiles representing the digital map are generated at a central server and can then be transmitted as necessary from the server to any vehicles travelling within the navigable (e.g. road) network and communicating with the server. A client application (interface) executing on a vehicle may communicate with the server using any suitable wireless communication protocol. In embodiments, the communication is performed using HTTPS protocol (over TLS). All messages transmitted between TLS server and TLS client are encrypted and remain private even if intercepted. TLS provides message integrity by calculating a message digest. Certificate chain-based certificate verification enables the TLS client (i.e. the portion of the client application (interface) communicating with the server) to authenticate the data that is provided from the TLS servers (i.e. the map tile data and the map tile metadata). However, other arrangements would of course be possible.

It will be appreciated that as used herein a "server" may generally refer to a set or cluster of one or more server(s). In particular, it will be understood that a server need not be a (single) physical data server but may comprise a virtual server, e.g., running a cloud computing environment. Thus, the server may be a cloud server. It will also therefore be appreciated that a vehicle may receive map data from a plurality of servers, e.g. which may obtain map data for a corresponding plurality of map data sources. Thus, any references to a server herein should be understood to mean "at least one server", except where context demands otherwise. Various other arrangements would of course be possible.

The server may thus generally comprise a tile generator that has access to a database of digital map data, as well as tile parameters indicative of the way in which the digital map data should be sorted into the tiles. The tile generator may be implemented by a digital map compiler. A digital map compiler compiles map information obtained from a database in one format into another format, e.g., one complying with a standardized map specification (NDS, OSM, etc.), or to generate map information for a specific application (car navigation, on-foot navigation, vehicle type specific navigation, public transport navigation, ADAS system, autonomous vehicle control, etc.). For example a map compiler may be provided by a back office application that may use proprietary information to compile the map information. The map compiler takes digital map data as presented in one form of presentation e.g. as presented in the digital map database, and generates tiles. Each tile contains digital map data relevant to a predetermined region covered by the digital map. That is, the digital map is typically generated by the server obtaining a set of map source data, sorting the map source data into the respective levels and/or tiles of the digital map, and then compiling the tile data structures accordingly. The data that is included into the map may be obtained from a plurality of different sources. It will be appreciated that the map data may be added into the tile data structures in any suitable format. For instance, object data may be stored either directly or indirectly in a data structure for a tile. Further, the data may be stored either in a compressed or uncompressed (raw) format, as desired. Preferably the data is compressed to facilitate transmission.

Once a map tile data structure for a particular tile has been compiled, the generated tile data structures can then be stored in a suitable map tile data store (e.g. database) at the server along with the respective tile data structures for the other tiles representing the digital map. Thus, whilst embodiments described in relation to generating tile data structure for a single tile it will be appreciated that tile data structures will be generated for each and every tile representing the map, in the same manner presented above. Tile data structures for map tiles (or at least the latest versions thereof) are then stored in a suitable map tile data store on the server. The server thus comprises a map tile data store. Thus, in embodiments, the method comprises storing tile data structure(s) in a map tile data store on the server from which they can subsequently be retrieved for transmittal from the server to any vehicles requiring the map data stored in the tile data structures. The server preferably also comprises a metadata data store for storing the associated metadata that is sent along with the tile data structures to the vehicles. The tile data structures are available for transmission from the map tile data store to a vehicle, e.g., in response to a request for information concerning a feature or area defined with the digital map, in a manner that will be described further below. The tile data structures will also be updated over time. Thus, a particular set of map tiles may collectively form a digital map having a particular 'map version'. Each map tile within the map has its own associated 'tile version'. It will be appreciated that a tile version may be associated with multiple map versions. The tile version and map version information is preferably stored and transmitted by metadata associated with the tile data structures. Accordingly there may be multiple metadata records for each map tile. The specified map version should generally be the latest map version available on the server (if connectivity is available to make a latest version call to the server via the first and second applications) or (if there is no connectivity) the latest map version used.

A tile rendering application can then retrieve tile data structures from the map tile data store as required for transmission from the server to a vehicle requesting map data, e.g. based on a current location of the vehicle or other location of interest. The tile data structures may thus be selectively transmitted (e.g. delivered) from the map tile data store to a client application (interface) executing on the vehicle from which the relevant map data can ultimately distributed to the map-based application(s) requiring the map data. For instance, the map-based application may generate a request for data relating to a certain real-world feature or geospatial area, or location, within the navigable (e.g. road) network. It will be appreciated that the map-based application does not use the data at a tile-level. Thus, the feature request must be converted into an appropriate request for object data (e.g. relating to an arc or node) that can be made at a tile-level. In embodiments a client application (interface) running on a computer device associated with the vehicle serves to action such requests to obtain the required map data. For instance, the client application (interface) may unpack the tile data structure to extract the data indicative of the one or more object(s), and then use the associated security data to verify the integrity of the extracted object data. The client application (interface) may, for example, execute at least in part on one or more electronic control unit(s) (ECU) of the vehicle.

In preferred embodiments the client application is divided into a first application (a client frontend) and a second application (a client backend) that are in communication with each other. This may provide a particularly efficient implementation for achieving the desired functional safety levels, as will be explained further below.

In particular, the client application may comprise a first application that is in communication with one or more map-based application(s) executing on-board the vehicle and a second application that is in communication with the server and with the first application. The first application is preferably executed on the same ECU as the map-based application. The second application could also be on the same ECU. In that case the first and second applications may interact by means of remote procedure calls with the underlying ECU platform provided inter process communication. This allows for relying on safe inter process communication provided by the ECU platform operating system, i.e. safe communication protocol stacks for inter processor communication can be avoided. However, this need not be the case and the second application may be provided on a separate ECU platform to the first application. Similarly, the first application may be provided on a separate platform to the map-based application. It will be appreciated that there may typically be a plurality of map-based applications executing on-board the vehicle and these may each be served by the same client frontend (or, alternatively, by a plurality of respective client frontends).

The first application (client frontend) serves to process the requests from the map-based application and to convert these into object requests, i.e. requests for object data relating to a certain (real-world) feature about which the map-based application is requesting information. The first application may thus receive requests from the map-based application(s) for map data regarding a certain feature of the navigable (e.g. road) network. The first application then processes this request to determine an object, as defined within one of the tiles representing the map, associated with that feature. The first application then requests from the second application the object data and security data for the area/object of interest. The object data and its associated security data is then obtained by the second application and provided to the first application. The first application may then perform the desired verification of the object data, i.e. the object level verification using the associated security data (e.g. hash value) for the objects that is also provided within the tile data structure. If the verification is successful the first application can then provide the object data to the map-based application(s). If the verification fails, an integrity error message may be generated which may prompt a further request, etc. Similarly, if the requested map data is not returned within a certain period, a timeout error message may be generated and communicated to the map-based application.

The second application (client backend) thus acts as the interface between the server and the first application (client frontend). The second application is thus operable to issue requests for digital map data to the at least one server. To reduce latency associated with such requests, at least some object data and security data received from the server may be, and preferably is, stored locally e.g. in a suitable cache that is accessible by the second application. Thus, when such data is requested from the second application by the first application, the second application may first attempt to obtain the data from an associated cache. If the data is not available in the cache (there is a cache miss), the data is then obtained from the server. On the other hand if the data is already available in the cache (a cache hit), this can then be provided immediately to the first application for verification, etc. The object data and security data may be periodically evicted from the cache, e.g. based on a suitable cache management policy. The second application thus preferably comprises one or more cache(s) for locally storing the tile data structures and the tile metadata. For instance, the second application may comprise a map tile cache storing a plurality of tile data structures obtained from the remote server. The second application preferably also a map tile metadata cache storing the associated metadata for each of the tile data structures that have been obtained from the remote server. The second application can then obtain any map data requested by the first application, either from the cache (if the data is available in the cache), or from the server, if necessary. The second application (client backend) also preferably performs the desired verification/authentication of the tile data structures as they are received from the server and added into the cache. For instance, when the tile data structures are digitally signed, the second application (client backed) preferably checks the digital signature to verify the tile data structure. That is, the tile-level verification is delegated to the second application (client backend) whereas the object-level verification is delegated to the first application (client frontend).

Thus, in embodiments, the method comprises receiving, by the first application, a request from the map-based application for digital map data concerning a feature of the navigable network; requesting, by the first application, the object data and security data (e.g. hash value) for the at least one arc or node relating to the requested digital map data from the second application; obtaining, by the second application, the requested object data and security data (e.g. hash value(s)) from the map tile cache, or the map tile data store if the required tile is not stored in the map tile cache, and providing them to the first application. Associated tile metadata may also be sent, e.g. as explained above. Thus, the method may further comprise requesting, by the first application, the metadata for the map tile concerning the at least one arc or node relating to the requested digital map data from the second application; obtaining, by the second application, the requested tile metadata from the map tile metadata cache, or the map tile metadata data store if the required tile metadata is not stored in the map tile metadata cache, and providing it to the first application. The first application can then verify the integrity of the data, using the associated security data (e.g. hash), before providing the data to the map-based application. Thus, the method may comprise, calculating, by the first application, a new hash value for the at least one arc or node; comparing, by the first application, the new hash value with the received hash value; and providing, by the first application, either the requested digital map data or integrity error message to the map-based application. In preferred embodiments the security data comprises a hash value that is determined based on (at least) the object data and also the associated tile metadata for the tile within which the object data is stored. Thus, the calculation of the new hash value may be performed using the object data and also the associated tile metadata.

The client application (interface) thus converts requests for information from the map-based application(s), which may be requests for information concerning any particular feature or area within the digital map, into requests for object data that is associated with such features to allow the relevant object data to be fetched from its associated tile data structure. The benefit of dividing the client application into a first application (client frontend) and a second application (client backend) in the manner described above is that the functional safety requirements can be delegated entirely to the first application (the client frontend). For example, it is the first application that preferably performs any desired verification of the object data before finally distributing the object data to the map-based application which generated the request. The first application (client frontend) should thus be developed to satisfy strict functional safety procedures required for ensuring the reliability of such data. However, this means that the second application (client backend) does not then need to satisfy such strict safety procedures.

For instance, the ISO 26262 functional safety standard for road vehicles defines four automotive safety integrity levels (ASIL), i.e. ASIL-A, ASIL-BASIL-B, ASIL-C, ASIL-D. ASIL-D dictates the highest level of safety integrity (with ASIL A dictating the lowest level of safest integrity). An additional class QM (Quality Management) is used to indicate when there are no safety requirements dictated. Developing high ASIL products is complex, and, due to the heavy requirements on the development process, labour intensive and costly. However, the ISO 26262 standard defined an ASIL decomposition method that allows for decomposing requirements with a high ASIL into two or more requirements with the same or lower ASIL. By applying this method, the part of the system that needs to be implemented at high ASIL can be limited, e.g. to the first application (client frontend).

For instance, it is typically desired for in-vehicle HD map delivery system to be developed at least at ASIL-BASIL-B. By dividing the client application as set out above, the first application (client frontend) can be developed at ASIL-BASIL-B standard (or higher, if desired). This implementation may involve using any suitable measures to account for random and/or systematic faults. For example, a random fault may cause a change in the code, in the stored data, or in the I/O data of a running software application. On the other hand, a systematic fault may occur due to errors in requirements, design or implementation of a software application. Reduction of random faults may be achieved, for example, by adding run-time testing, fault detection, fault monitoring, redundant execution, and redundant diverse implementations. For instance, increasing the number of (separately developed) implementations of a module in a software application, makes that module less vulnerable to random faults as the random fault is extremely unlikely to cause the same effect in both implementations. This can be detected in the software application. Such diverse software modules also reduce systematic faults as different implementations are unlikely to have the same software bugs. Any of these techniques may be used when designing the first application (client application) at the desired level of functional safety. For instance, the client application may in embodiments be implemented at least in part redundantly.

However, the second application (client backend) that interfaces with the server does not need to satisfy such requirements. Thus, in a particularly preferred embodiment, the first application is developed at ASIL-BASIL-B level (or higher), whereas preferably the second application is developed at a lower level of functional safety. This also helps simplify the overall map distribution system since it is not necessary to develop the interface with the server (i.e. the second application (client backend)) at the same level as the client fronted, e.g. at ASIL-B level. This may be vastly more efficient than attempting to implement the whole system, including the interfaces with the external server, at the required, e.g. ASIL-B, functional safety level. Thus, in effect, according to the preferred embodiments, the retrieval and authentication of the map tiles can be (and is) made independent of the verification of the object data within the map tiles. This allows for the functional safety requirements to be met without significantly increasing the complexity of the system.

For example, as mentioned above, the tile-level authentication/verification is preferably performed by the second application (client backend), preferably using a digital signature that has been applied to the tile data structures at the server. It will be appreciated that digital signatures can readily be implemented, e.g., at ASIL-QM standard, but may be more difficult to implement at higher safety levels such as ASIL-B. On the other hand, the object-level verification is preferably performed by the first application (client frontend), at ASIL-B standard (or higher). For instance, the object-level verification is preferably performed using, e.g., hash values, as described above, which can readily be implemented at the desired safety level.

Thus, after the second application (client backend) has verified the authenticity/integrity of the tile data structures, the first application (client frontend) can then perform a further verification to verify the integrity of the object data received from the second application (client backend) prior to passing the object data onwards, e.g. ultimately to the map-based application(s). In this way, the client application (interface) can be implemented at the desired functional safety level in an efficient manner.

If verification fails, this can then be signalled to the map-based application as an integrity error. The first application (client frontend) may attempt to re-try to fetch the data. Where the object data is safety critical and the verification fails the map-based application may then go into a "safe-mode", e.g. by disabling automated driving systems or safely stopping the car. It will be appreciated that the map-based application may be any application that may require map data. Preferably this is an AD or ADAS application since it is in this context where the map data may be safety critical and must therefore be verified. Similarly, the map-based application may comprise a vehicle horizon provider that in turn provides map data to an autonomous driving application. Thus, in embodiments, the map-based application is an autonomous driving application or wherein the map-based application is a vehicle horizon provider that in turns provides map data to an autonomous driving application. However in principle could also be used to deliver map data to any other navigation or geo-spatial aware applications executing within the vehicle's environment.

From another aspect, at the client side, there is provided a method of operating a client application executing onboard a vehicle traversing a navigable network in a geographical area covered by a digital map, wherein the digital map is represented as a set of plural map tiles, each tile representing a particular geographical area including a portion of the navigable network, and wherein each map tile has an associated map tile data structure including:

object data indicative of a set of one or more object(s) falling at least partially within the geographical area covered by the map tile and/or within the geographical area covered by another one or more of the map tile(s) representing the digital map; and security data for verifying the integrity of the object data associated with at least one object for which object data is stored in the map tile data structure, the method comprising:

receiving, at the client application, a request from one or more map-based application(s) for map data relating to one or more feature(s) of the navigable network;

obtaining, by the client application, object data related to the feature(s) from the respective map tile data structure;

obtaining, from the respective map tile data structure, associated security data for the obtained object data; and the client application using the security data to verify the integrity of the object data and, when the data is verified, passing the object data to the map-based application(s).

From a further aspect there is provided a client application executing on-board a vehicle travelling within a navigable (e.g. road) network covered by a digital map, wherein the digital map is represented as a set of plural map tiles, each tile representing a particular geographical area including a portion of the navigable network, and wherein each map tile has an associated map tile data structure including: object data indicative of a set of one or more object(s) falling at least partially within the geographical area covered by the map tile and/or within the geographical area covered by another one or more of the map tile(s) representing the digital map; and security data for verifying the integrity of the object data associated with at least one object for which object data is stored in the map tile data structure, wherein the client application is configured to: receive a request from one or more map-based application(s) for map data relating to one or more feature(s) of the navigable network; obtain object data related to the feature(s) from the respective map tile data structure; obtain from the respective map tile data structure, associated security data for the obtained object data; and use the security data to verify the integrity of the object data and, when the data is verified, passing the object data to the map-based application(s).

From a further preferred aspect, there is provided a method of operating a client application running on one or more processing units of a vehicle traversing a navigable network in a geographical area to provide digital map data from at least one remote server to a map-based application running on an electronic control unit (ECU) of the vehicle, wherein: the client application comprises a first application and a second application, the first application being in communication with the map-based application and the second application, and the second application being in communication with the at least one remote server; the at least one remote server has access to: (i) a map tile data store storing a plurality of map tiles, each map tile representing the navigable network in a portion of the geographical area as a plurality of arcs connected by nodes; and (ii) a map tile metadata data store storing metadata for each of the map tiles in the map tile data store, wherein each arc and node of a tile have object data and a hash value associated therewith, the hash value being calculated based on at least the object data for the respective arc or node and tile metadata for the tile containing the object data for the respective arc or node; and the second application comprises: (i) a map tile cache storing a plurality of map tiles obtained from the at least one remote server; and (ii) a map tile metadata cache storing the metadata for each of the map tiles in the map tile cache obtained from the at least one remote server, the method comprising:

receiving, by the first application, a request from the map-based application for digital map data concerning a feature of the navigable network;

requesting, by the first application, the object data and hash value for the at least one arc or node relating to the requested digital map data from the second application;

obtaining, by the second application, the requested object data and hash value(s) from the map tile cache, or the map tile data store if the required tile is not stored in the map tile cache, and providing them to the first application;

requesting, by the first application, the metadata for the map tile concerning the at least one arc or node relating to the requested digital map data from the second application;

obtaining, by the second application, the requested tile metadata from the map tile metadata cache, or the map tile metadata data store if the required tile metadata is not stored in the map tile metadata cache, and providing it to the first application;

calculating, by the first application, a new hash value for the at least one arc or node based on the received object data and tile metadata;

comparing, by the first application, the new hash value with the received hash value; and providing, by the first application, either the requested digital map data or integrity error message to the map-based application based on the comparison.

The methods of operating a client application (interface) described above may be advantageous in its own right in order to satisfy functional safety requirements, irrespective of whether object level verification is used. For instance delegating functional safety to frontend allows this to be isolated from the map tile access which can help simplify the access requests and avoid having to build the entire map distribution system including the server interface at a high (e.g. ASIL-BASIL-B) level. Instead, the ASIL-B requirement is satisfied by decomposing the client application into a relatively secure frontend and less secure backend. The present invention thus also extends to in-vehicle distribution systems based on the principles above. In that case, the first application (client front end) should preferably run on the same ECU as the map-based application (although this would not be essential), and that the map data returned to the map-based application is extracted from the object data obtained from the relevant map tile.

Thus, from another aspect there is provided a method of operating a client application running on one or more processing units of a vehicle traversing a navigable network in a geographical area to provide digital map data from at least one remote server to a map-based application running on an electronic control unit (ECU) of the vehicle, wherein: the client application comprises a first application running on the ECU and a second application, the first application being in communication with the map-based application and the second application, and the second application being in communication with the at least one remote server; the at least one remote server has access to a map tile data store storing a plurality of map tiles, each map tile representing the navigable network in a portion of the geographical area as a plurality of arcs connected by nodes, wherein each arc and node of a tile have object data associated therewith; and the second application comprises a map tile cache storing a plurality of map tiles obtained from the at least one remote server, the method comprising:

receiving, by the first application, a request from the map-based application for digital map data concerning a feature of the navigable network;

requesting, by the first application, the object data for the at least one arc or node relating to the requested digital map data from the second application;

obtaining, by the second application, the requested object data from the map tile cache, or the map tile data store if the required tile is not stored in the map tile cache, and providing them to the first application;

identifying, by the first application, the portion of the object data corresponding to the feature of the navigable network; and providing, by the first application, the requested digital map data to the map-based application using the identified portion of the object data.

It will be appreciated that any of the further aspects of the invention may include any or all of the features of the invention described in relation to any other aspects and embodiments of the invention to the extent they are not mutually inconsistent therewith. In particular, it will be appreciated that the invention in the second and further aspects may comprise any or all of the features described in respect of the method of the first aspect of the invention, and vice versa.

The present invention also extends to map data delivery and map data distribution systems for performing the methods described above in relation to any of the aspects and embodiments of the present invention. For instance, a map data delivery/distribution system may comprise a server in communication with one or more vehicle(s), the server comprising a suitable map generating circuit (including a map tile compiler, etc.), one or more data store(s) for storing the map tile data and metadata, and a transmission circuit for transmitting the map tile data structures to the vehicle. The vehicle includes one or more processor(s) that execute various client applications that handle the map tile data structures as well as one or more map-based application(s) running on an engine control unit (ECU) of the vehicle requiring the map data. Such systems may be arranged to perform any (or all) of the method steps herein described. For instance, the system may comprise a set of one or more processors that are operable or configured to carry out the steps mentioned. Any step may be carried out by any one of the processors, or by multiple processors.

The various functions of the technology described herein can be carried out in any desired and suitable manner. For example, the steps and functions of the technology described herein can be implemented in hardware or software, as desired. Thus, for example, unless otherwise indicated, the various processors, functional elements, stages, and "means" of the techniques described herein may comprise any suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner. For example, the means for carrying out any of the steps of the method according to any of the aspects or embodiments described herein may generally comprise a set of one or more processors (or processing circuitry) configured, e.g. programmed with a set of computer readable instructions, for doing so. A given step may be carried out using the same or a different set of processors to any other step. Any given step may be carried out using a combination of sets of processors. The system may further comprise data storage means, such as computer memory, for storing, for example, the at least one repository including the instructive and informative data. Any of the methods in accordance with the present invention may be implemented at least partially using software, e.g. computer programs. The present invention thus also extends to a computer program product comprising computer readable instructions executable to perform, or to cause a system and/or server to perform a method according to any of the aspects or embodiments of the invention. Thus, the present invention extends to a, preferably non-transitory, computer program product comprising computer readable instructions executable when run on a system in accordance with any of the embodiments of the invention to cause a set of one or processors of the system to perform the steps of any of the aspects or embodiments of the method described herein.

It should be noted that references to an object, a feature, an area, etc. associated with, etc., a tile, or tile data structure, herein should be understood to refer to data indicative of these unless the context demands otherwise. The data may be in any way indicative of the relevant item, and may be directly or indirectly indicative thereof. Thus any reference to an object, a feature, an area, a tile, etc., may be replaced by a reference to data indicative thereof. It should also be noted that the phrase "associated therewith" or "indicative of" should not be interpreted to require any particular restriction on data storage locations. The phrase only requires that the features are identifiably related.

Various features of embodiments of the invention will be described in further detail below.

BRIEF DESCRIPTION OF THE DRAWINGS

Various embodiments will now be described, by way of example only, and with reference to the accompanying drawings in which.

Like reference signs will be used for like elements in the drawings, as appropriate.

DETAILED DESCRIPTION

The present invention generally relates to methods of obtaining digital map data for use by geo-spatial aware map-based applications, particularly for autonomous driving (AD) and advanced driver assistance system (ADAS) applications where the reliability and accuracy of the digital map data is safety critical. An embodiment will now be described of an efficient implementation of a map client application executing on-board a vehicle with an enhanced (e.g. ASIL-BASIL-B) level of functional safety.

Functional safety is important when an automated function has a potential impact on a person. Such automated functions generally are required to meet certain standardized functional safety levels, either by regulators, clients, or users. Meeting such functional safety requirements over the product lifecycle has a significant impact on the design, testing and support of an implementation. The technical impact of an implementation for an automated function according to functional safety requirements may be a substantially larger and more complex implementation. This may be visible, e.g., in an increased code size and required data storage for the functionally safety implementation.

Functional safety deals with assuring that an implementation will operate as expected. This means that the implementation needs to consider the impact of both random faults and systematic faults. Random faults are introduced by aging effects of materials, by external factors such as vibration, temperature, humidity, radiation, etc. A random fault may cause a change in the code, in the stored data, or in the I/O data of a running software application. A systematic fault may occur due to errors in requirements, design or implementation of a software application. Functional safety engineering practices aim to reduce systematic faults by employing rigorous development practices intended to substantially reduce the likelihood of systematic faults. Reduction of random faults may be achieved, for example, by adding run-time testing, fault detection, fault monitoring, redundant execution, and redundant diverse implementations.

The increased fault resilience of implementations developed with functional safety engineering methodology comes at a cost of doubling or tripling the cost of hardware, software, development, testing, and maintenance.

Figure 1:
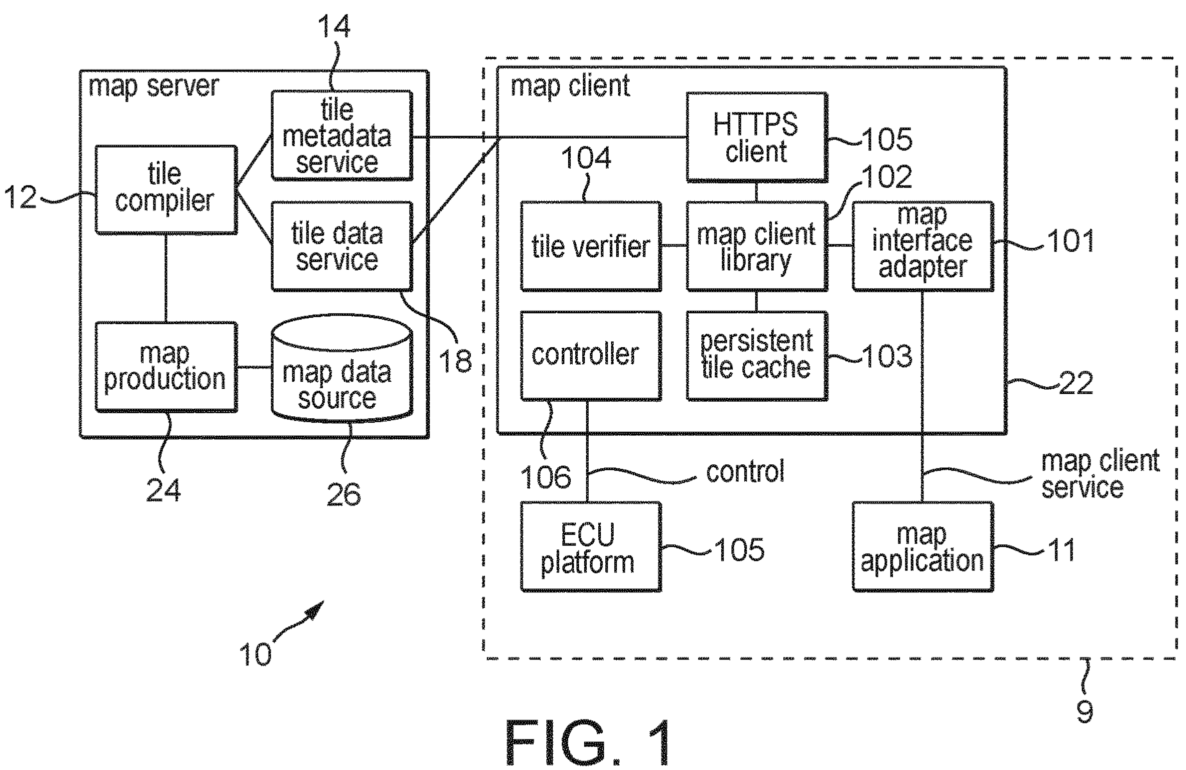
FIG. 1 shows an overview of a map delivery system in accordance with some embodiments.

FIG. 1 depicts an overview of the map delivery system 10 which comprises a map compiler 12 and tile metadata service 14 deployed on a cloud server system 16, a tile data service 18 deployed on a Content Distribution Network (CDN) 20, and a client application (interface) 22 deployed on the vehicle. The combination of metadata service 14 and data service 18 is also referred to together as a "cloud service".

The map compiler 12 receives map data from a suitable map production unit 24 located on the cloud server system 16. The map production unit 24 receives map source data from various data sources 26 and then converts this into a suitable format for inclusion into the digital map. The map compiler 12 then sorts the map data into respective layers and tiles for the digital map, as will be described further below.

In this way, the map delivery system 10 is able to deliver map data from the map production 24 in the cloud directly to an autonomous driving application 11 executing on an electronic control unit (ECU) of a vehicle 9, using the map client 22.

FIG. 1 shows the functional modules of the map client 22 and the interfaces to the map server infrastructure and to the various functional modules in the vehicle. For instance, the map client 22 of FIG. 1 comprises six components, i.e. a map interface adapter 101, a client library 102, a persistent cache 103, a tile verifier 104, a HTTPS client 105, and a controller 106. The functions of these will be described in further detail below, in relation to the map client shown in FIG. 11. However, it will be appreciated already from FIG. 1 that due to the number of interfaces and the number of functional components in the map client, a functional safety implementation of the map client is both complex and may require substantial resources (computing power, storage requirements, energy consumption, etc.).

The map delivery system 10 shown in FIG. 1 is generally operable to deliver the required digital map data to any map-based applications executing on-board the vehicle requiring the map data. Digital map data is typically complex.

For instance, it will be understood that a digital map generally includes a number of map objects representing real-world objects, such as navigable elements of a navigable (road) network, junctions, points of interest etc. The navigable (e.g. road) network is generally a network comprising a plurality of interconnected (e.g.) roads that are navigable by a vehicle. The navigable (e.g. road) network may generally be represented by a digital, or electronic, map (or mathematical graph). In its simplest form, a digital map is effectively a database containing data representative of nodes, most commonly representative of road intersections, and arcs between those nodes representing the roads between those intersections. In more detailed digital maps, arcs may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and arcs (or segments of arcs) are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another. For the purposes of conventional navigation guidance, e.g. as may be provided by a known portable navigation device, the elements of the digital map need only (and typically will only) contain information regarding the road centerlines, although each road segment may also be supplemented with attributes such as the maximum speed permitted, the lane size, number of lanes, whether there is a divider in-between, etc. However, according to embodiments of the present invention, as will be described further below, a digital map may be generated (or used) that provides a more accurate and realistic representation of the roadway profile including lane centerlines and lane connectivity (i.e. lane markings), as well as other key elements e.g. such as three-dimensional geometries of the navigable (e.g. road) network such as landmark objects that may be desirably incorporated into the map. This type of digital map may be referred to as a "HD" map (compared to a conventional "SD" map containing the road centerlines but not the lane centerlines). The additional information contained in the HD map, and at least the lane markings, is generally required for the purposes of autonomous driving (AD). However, the use of these HD maps is not limited to AD applications, and these maps may also find suitable application in any other application where it is desired to provide an improved and more accurate representation of the roadway profile, including, but not limited to, various advanced driver-assistance system (ADAS) applications. Digital map data may also be used in numerous other map-aware or geo-spatial applications, not necessarily related to travel, e.g. applications requiring knowledge of location, e.g. weather applications. Thus, the HD map may also contain data representative of any other features that may suitably and desirably be included in such a map. Although various embodiments will now be described with respect to HD maps, it will be appreciated that the technology described herein is also applicable to SD maps.

Automated vehicles are critically reliant on external data, e.g. sensor information and HD maps. If the integrity or authenticity of this data is compromised, automated driving functions will use faulty data to manoeuvre the vehicle, which might result in hazardous driving. The safety goals of the vehicle's automated driving tasks are to keep the risk of physical injury or damage to the health of people below an acceptable level. Thus, it is desired to ensure the functional safety of such map data before it is used.

Figure 2:
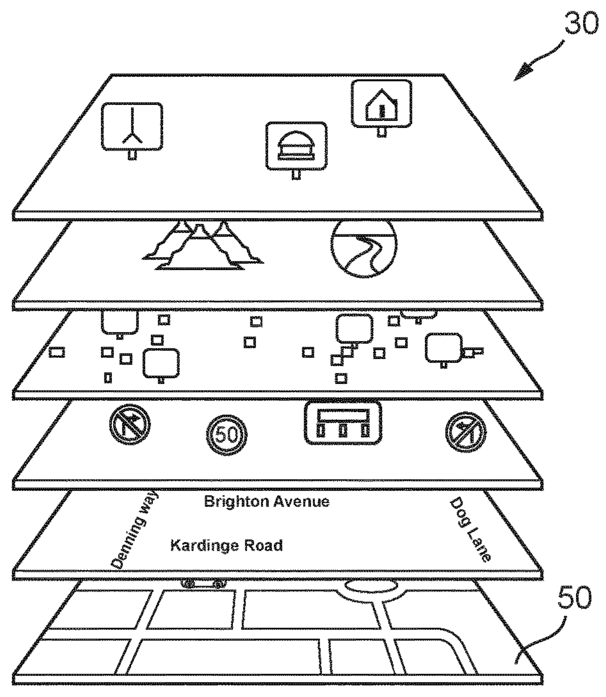
FIG. 2 shows a map divided into a plurality of levels in accordance with some embodiments.
Figure 3:
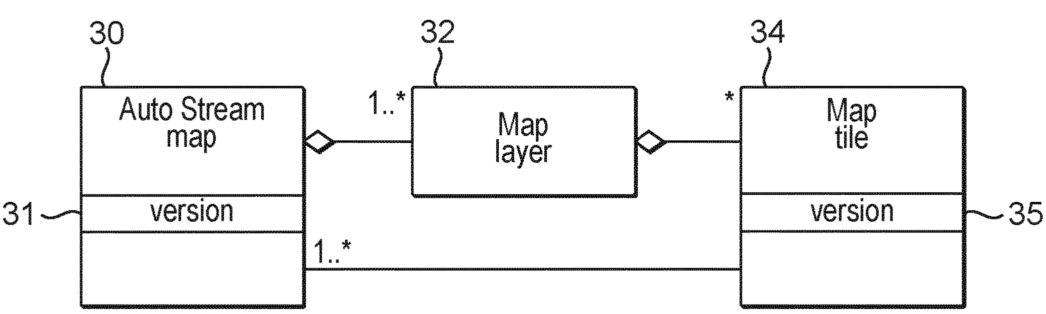
FIG. 3 shows how data is organized within a digital map in accordance with some embodiments.

In the present embodiments, the HD map data comprises a plurality of layers and each layer comprises a plurality of tiles. The tiles are associated with geospatial rectangular areas. The overall map and the individual map tiles each have a 'version' and a map comprises a consistent set of layers and tiles. A tile may be part of several versions of the map, i.e. a tile of a specific version may be associated with multiple map versions. The map data may thus be split into layers to group the data according to the type of data, such that clients are able to selectively download the data that is relevant for their purpose. An example of this is illustrated schematically in FIG. 2 which shows a map 30 divided into a plurality of levels. In particular, the map includes a base level 50 including the basic road and lane geometry and a series of higher levels storing different types of data associated with the road network. Each layer is then represented as a plurality of tiles. FIG. 3 thus shows how data is organised within the digital map. In particular, the digital map 30 is composed of a plurality of map layers 32 each of which is in turn comprised of a plurality of map tiles 34. The digital map 30 is associated with a map version 31 and the map tiles 34 are associated with a tile version 35. The current map version 31 thus includes the most recent set of map tile versions 35. The map and tile version information is preferably transmitted as metadata for the tiles.

Figure 4:
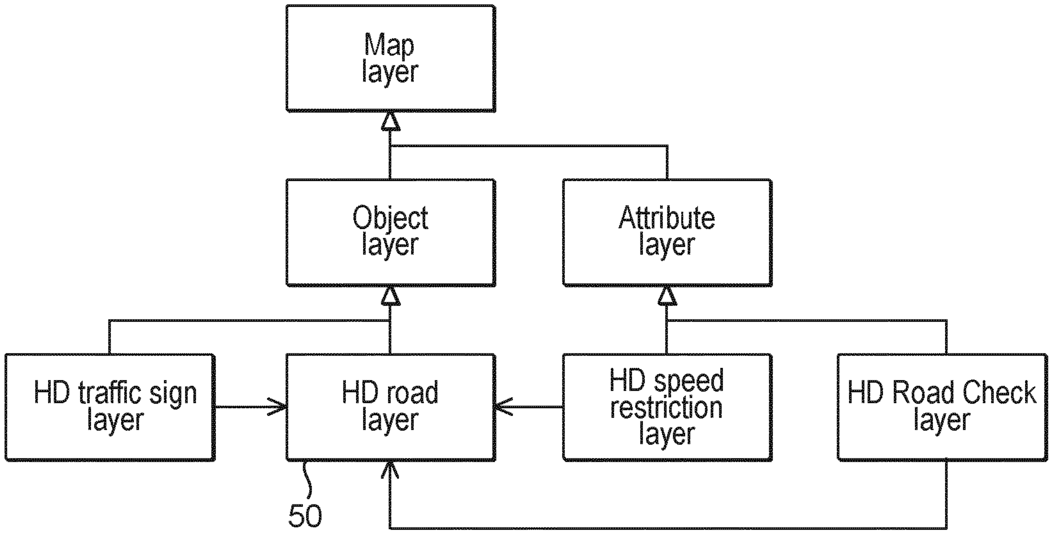
FIG. 4 shows map layers including object layers and attribute layers in accordance with some embodiments.
Figure 5:
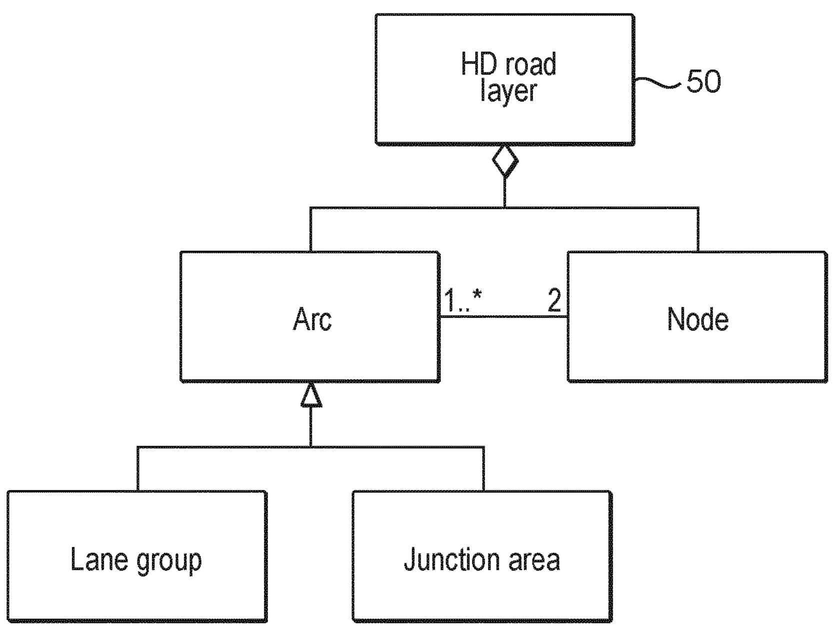
FIG. 5 shows a high level composition of a data structure for a road layer in accordance with some embodiments.

As depicted in FIG. 4, the present embodiments distinguish two types of map layers, i.e. object layers and attribute layers. Object layers contain geospatial objects with associated geometry and infrequently changing attributes. Objects may have associations with other objects either in the same layer or in another layer. Attribute layers contain attributes associated with geospatial objects present in another layer. Attributes present in attribute layers are typically expected to change more frequently than the objects they are associated with. For instance, in the present embodiments, the map includes a base layer that is referred to as the HD road layer. The HD road layer is a directed graph comprising arcs and nodes. Each arc has two associated nodes, i.e. one node for the connections with incoming arcs and one node for the connections with outgoing arcs. There are two types of HD road arcs, i.e. lane groups and junction areas. Lane groups consist of one or more lanes with geometries and attributes. Junction areas comprise geometry, legitimate trajectories and attributes. The high-level composition of a data structure for the road layer 50 is depicted in FIG. 5.

Figure 6:
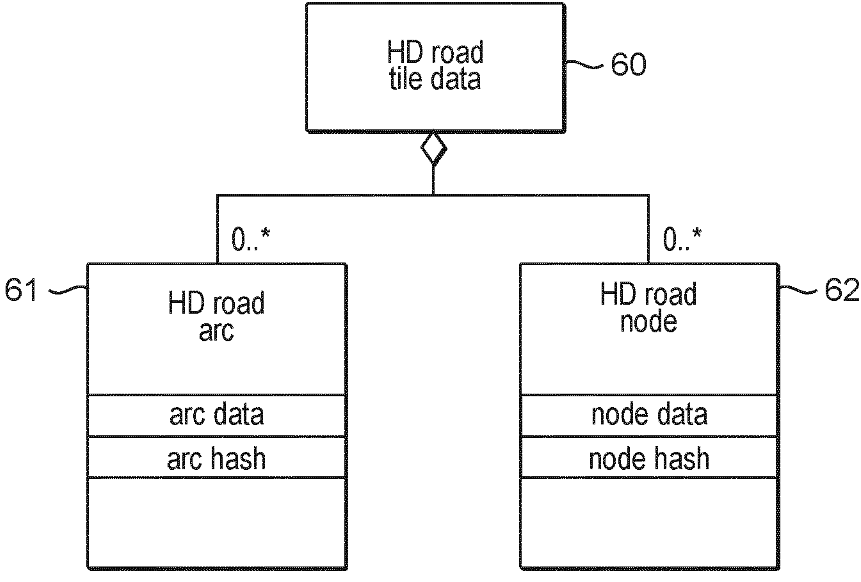
FIG. 6 shows a data structure for a tile in a road layer in accordance with some embodiments.

The road layer 50 in turn consists of a plurality of HD road tiles. That is, the HD road layer is divided into a plurality of road tiles, each road tile including arc and node data for the area of the map represented by the tile. The data structure for a tile 60 in the road layer is shown in FIG. 6. In particular, for each road arc 61 and node 62 falling within the region of the map covered by the tile, security data in the form of a suitable hash is stored alongside the associated arc/node data. In other words, an object-level verification is provided.

Figure 7:
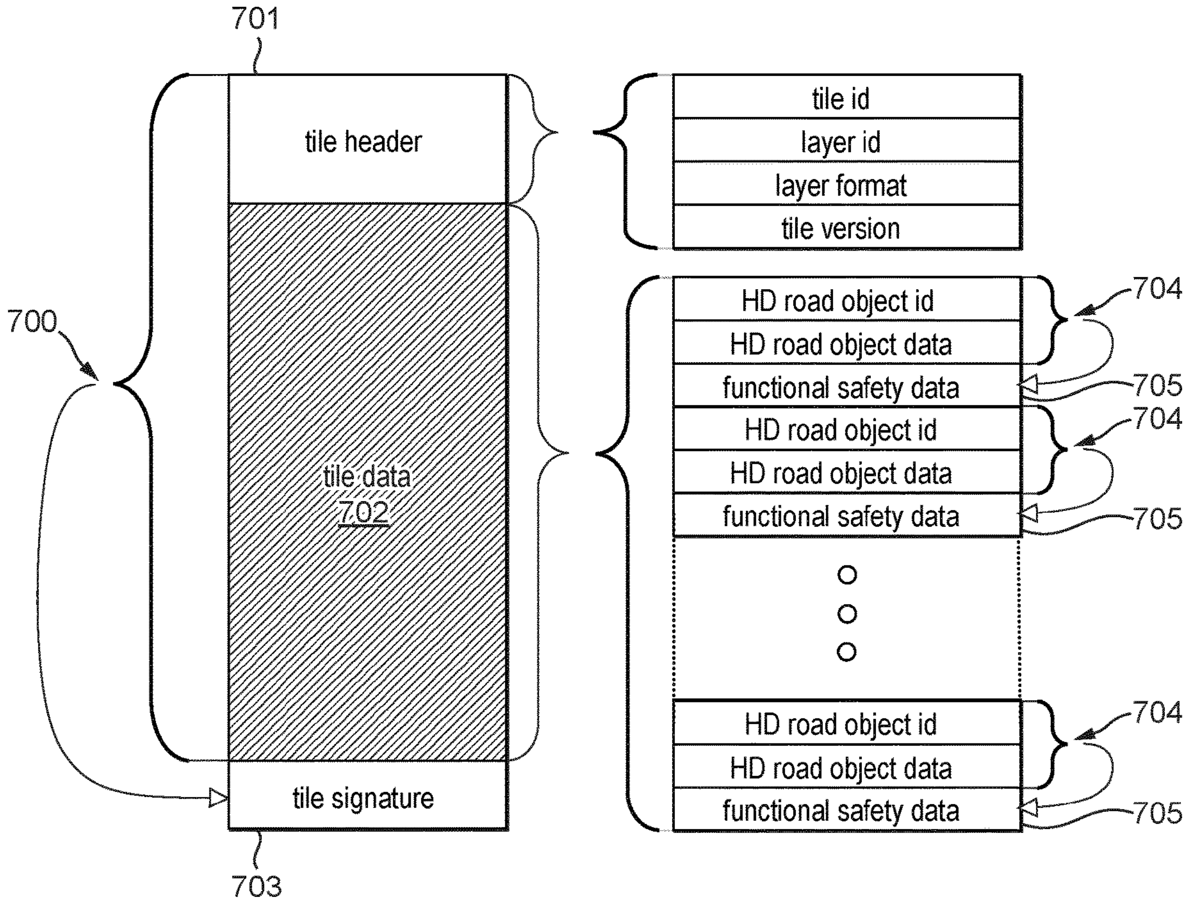
FIG. 7 shows a tile data structure in accordance with some embodiments.

FIG. 7 shows in more detail an example of a tile data structure 700 that may be generated and transmitted in the present embodiment. The tile data structure 700 comprises a tile header 701, tile data 702, and a tile signature 703. When the tile data structure 700 is transmitted to a client application, the tile header 701 can be read, in the usual fashion, to identify the tile in question. For instance, the tile header 701 may include information such as a tile id, a layer id, layer format, tile version, and so on. The tile data 702 can then be extracted appropriately. In the present embodiment the tile data structure 700 is digitally signed with a tile signature 703 allowing the authenticity of the tile data structure 700 to be verified.

The tile data 702 includes a list of HD road objects (e.g. HD road arcs or HD road nodes) 704. A HD road object comprises a map object id and map object data. The HD road object id field establishes a unique referencing of the HD road object. In some variants, the HD road object id may be associated with location origin for the HD road object relative to the map area covered by the tile. The HD road object data comprises a field to determine the type of the HD road object (e.g. arc data or node data) and the data field to describe the arc or node.

For each road object 704 a set of associated functional safety data, i.e. security data, 705 is also included in the tile data structure 700. In the example shown in FIG. 7 the tile data 702 comprises an ordered list of object data 704 and associated security data 705. However, this need not be the case and the data may of course be arranged in any suitable fashion.

In the present embodiment, the security data 705 is a hash value that extends over the map object id and the map object data. The present embodiment uses a secure hash function as this is relatively insensitive to any fault causes or fault patterns of the protected data. However, the functional safety data may be any error detection code (minimum distance code, hash code, checksum code, parity code, cyclic redundancy check code) or any error correction code (Block code, Convolutional code, Hamming code, Viterbi code).

In addition, the HD map may include other layers, e.g. an HD speed restriction layer, an HD traffic sign layer, and so on. The HD speed restriction layer consists of a set of lane-stretch associated speed restrictions. Speed restrictions in the speed restriction layer are related to lanes and lane groups in the HD road layer. Similarly, the HD traffic sign layer consists of a set of traffic signs with geometries and attributes. Traffic signs may be associated with objects in the HD road layer. However other arrangements of layers would of course be possible and in general the HD map may include additional or fewer layers, as desired.

Figure 8:
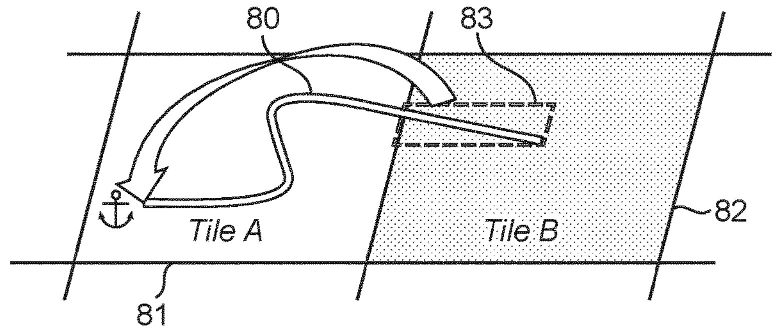
FIG. 8 shows a road element extending from a first tile into a second tile in accordance with some embodiments.

According to the present invention, lane groups, junction areas, and nodes (i.e. connections) are preferably stored in a single tile, even if in reality they cross the geospatial boundaries of tiles. In addition to the advantage that there is no cutting and stitching to do (with possibly of losing data quality), tiles remain highly independent and the integrity of these meaningful entities can be provisioned for in the data structures of the tile they belong to, as will be explained further below. In embodiments this is done by duplicating the object data for both (or all) tiles over which the associated object extends and storing the object data separately for both tiles. However, it would also be possible to store the object data in only one of the tiles, with the other tiles then containing a suitable reference (e.g. pointer) to the tile in which the data is stored. This approach is illustrated in FIG. 8 wherein a road element 80 extending from a first tile 81 into a second tile 82 is stored only in the first tile 81. An appropriate bounding box 83 representing the location of the road element 80 is then stored in the second tile 82 along with a suitable reference (pointer) to the first tile 81 pointing to the relevant object data for the element 80.

Figure 9:
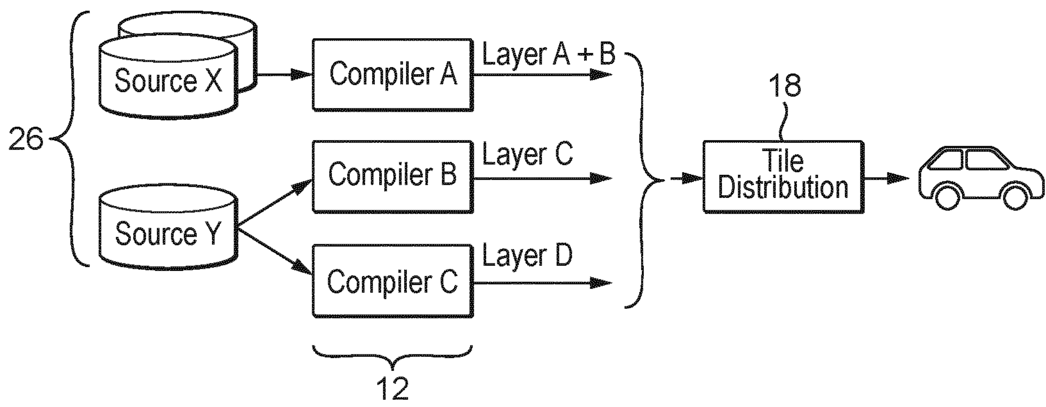
FIG. 9 shows a map production system in accordance with some embodiments.

FIG. 9 shows an example of a map production system according to an embodiment. As shown, map source data is obtained from a plurality of sources 26, and the map source data is then sorted into the respective levels and tiles within the levels by suitable map compilers 12. The map tiles can then be distributed appropriately to vehicles requiring the map data by the tile data service 18.

Figure 10:
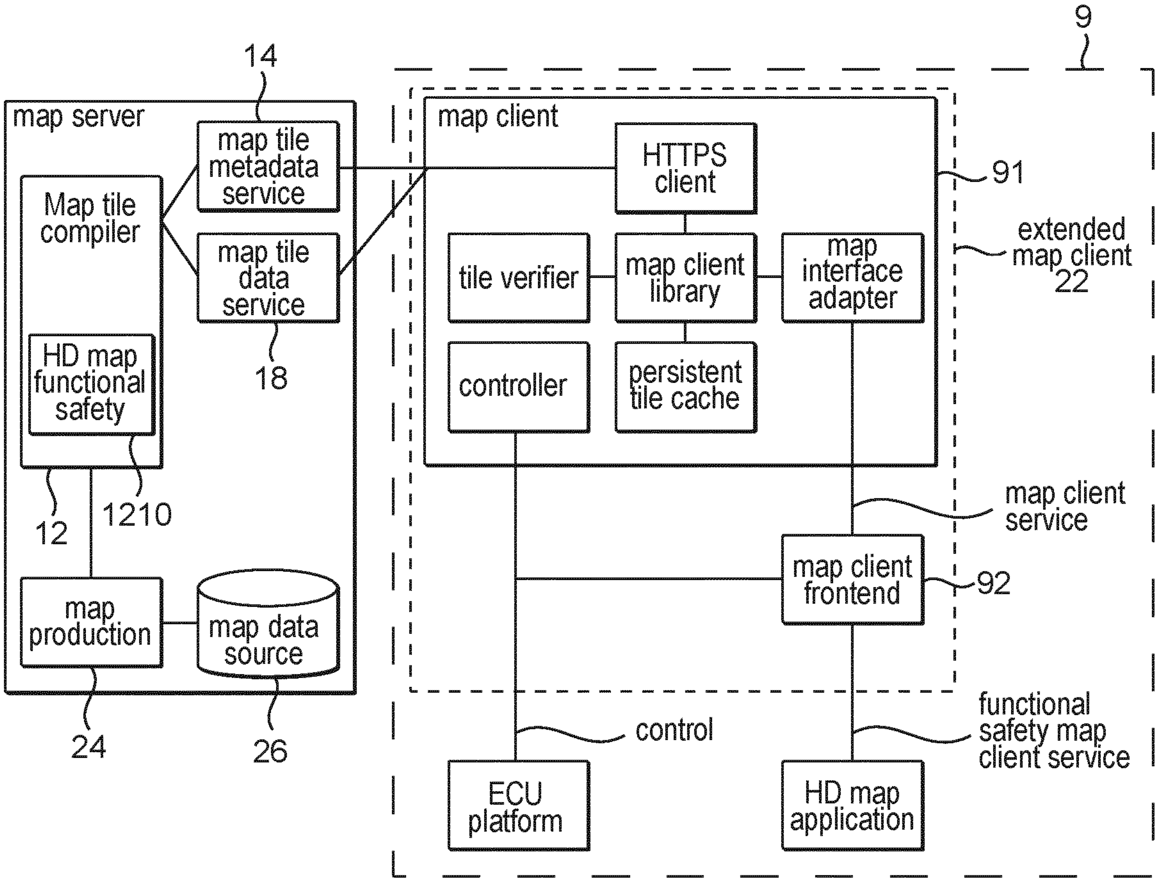
FIG. 10 shows a cloud-based map delivery system in accordance with some embodiments.

FIG. 10 shows schematically a cloud-based map delivery system according to an embodiment wherein map data is delivered from the cloud to a vehicle running one or more map-based applications. The system of FIG. 10 consists of map production in the cloud, map tile delivery from cloud to vehicles, and in-vehicle map distribution to the map applications, similarly as described above in relation to FIG. 1. However, in FIG. 10, the map tile compiler 12 now includes a map functional safety circuit 1210 that acts to add the security data for the objects into the map tile data structures, i.e. in the manner shown in FIG. 7, above. The HD functional safety module 1210 extends the tile map compiler with functionality for protecting the integrity of the map objects contained in map tiles. Naturally there are a wide range of possible implementations for generating the security data and associating it with the object data.

Furthermore, in FIG. 10, the client application interface 22 is decomposed into a relatively small client frontend 92 (a first application) and a larger client backend 91 (a second application). The client backend implements functional requirements and safety requirements at QM(B) while the client frontend implements safety requirements at ASIL-BASIL-B(B). The invention regards the client frontend 92 being small and simple by the created capability of verifying the integrity of HD map data at the level of entities that are meaningful for the HD map application, i.e. are lane groups, junction areas, and their associated entities, currently only attributes like speed restrictions.

Figure 11:
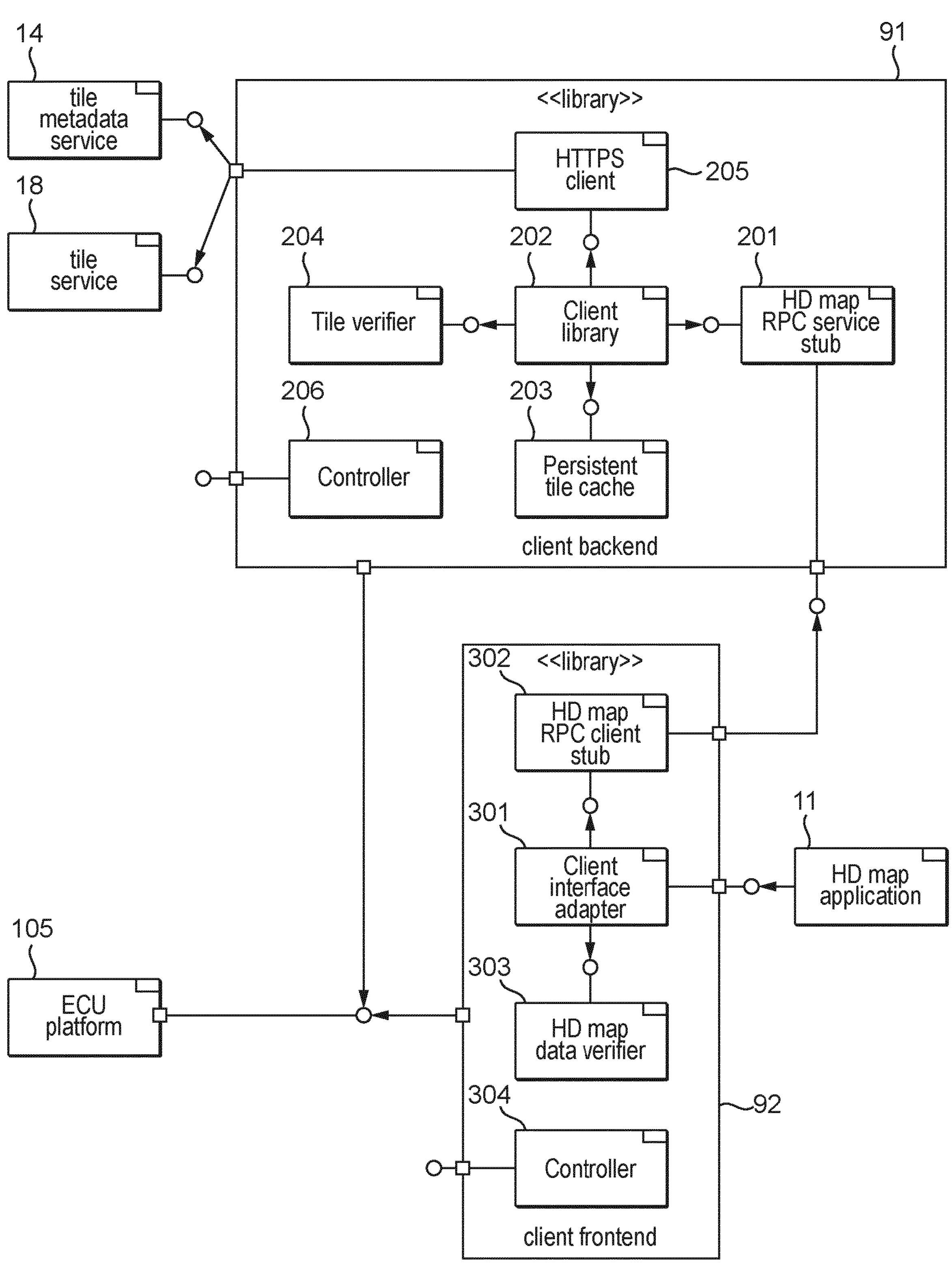
FIG. 11 shows client frontend in accordance with some embodiments.

The client frontend 92 is depicted in more detail in FIG. 11 and comprises four components, i.e. the client interface adapter 301, the HD map RPC client stub 302, the HD map data verifier 303, and the controller 304. The client frontend is a software library that is developed in compliance with ISO 26262 ASIL-BASIL-B required procedures. The library is linked with other software and part of an executable that is deployed on a process provided by the ASIL-B compliant ECU platform operating system 105. The client frontend is initialised, controlled, and monitored via the interface provided by its controller component 304. The controller 304 interacts with other client frontend embedded components, but interfaces for those interactions are not depicted in FIG. 11.

The client interface adapter 301 provides the client frontend service interface to the HD map applications 11. Service requests received from the HD map applications 11 are passed to the client backend via the HD map RPC client stub 302. HD map data returned by the client backend 91 is verified by the HD map data verifier 303 prior to responding to the associated service requests.

The HD map verifier 303 is an integral part of achieving the required functional safety. All object level safety mechanisms are based on hashes. SHA-256 hashes truncated to 64 bits are used, because 64 bits is an acceptably small size while the collision probability of $2^{-64}$ ($=5.42*10^{-20}$) translates in the same low safety mechanism failure rate. The client frontend 92 checks the integrity and verification of the object data. The client frontend 92 may also check integrity of latest map version, or perform any other desired safety checks.

The client backend 91 is also depicted in FIG. 11 and comprises six components, i.e. the HD map RPC service stub 201, the client library 202, the persistent cache 203, the tile verifier 204, the HTTPS client 205, and the controller 206. The client backend 91 is a software library that is developed using standard Quality Management (QM) defined procedures. The library is linked with other software and part of an executable that is deployed on a process provided by the ASIL-B compliant ECU platform operating system 105. The client backend is initialised, controlled, and monitored via the interface provided by its controller component 206. The controller interacts with other client backend embedded components, but interfaces for those interactions are not depicted in FIG. 11.

Service requests received from the client frontend 92 are passed to the client library 202. The client library services these requests for which it might need to retrieve tile data and tile metadata either from the persistent tile cache 203 or from the cloud service, i.e. from the tile data service 18 and the tile metadata service 14. Prior to using tile data and tile metadata received from the cloud service, its integrity and authenticity is verified by the tile verifier 204. For instance, the map tiles may each have a digital signature (applied by the at least one remote server). The signature is verified by the client backend before data is provided to the client frontend. It will be appreciated that checking digital signatures is more complicated than hashes and difficult to implement in ASIL-B. However, this can readily be done at QM level in the client backend 91.

In case of verification issues an error is reported to the tile data service and, if applicable, to the client frontend 92 via the response of the initiating service request. The HD map RPC client stub 102 in the client frontend also includes a timeout mechanism. This timeout mechanism triggers the return a timeout error in case the client backend 91 does not respond to API calls within a specified timeout (passed as API call parameter).

Figure 12:
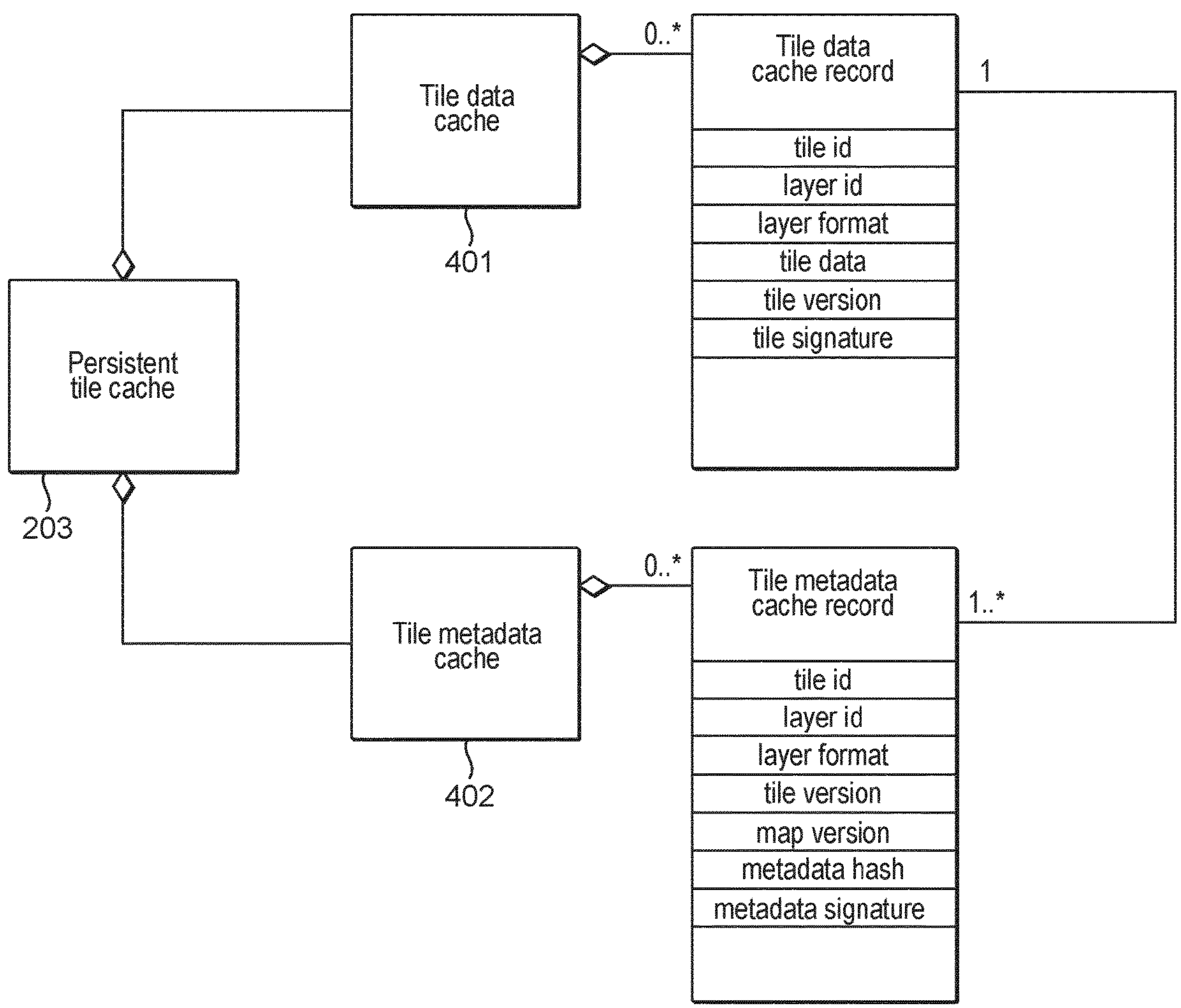
FIG. 12 shows a persistent tile cache in accordance with some embodiments.

The client library 202 stores tile data and tile metadata in the persistent cache 203 such that it is readily available for later use. Prior to using data retrieved from the persistent tile cache 203, its integrity is verified by the tile verifier 204. In case of verification issues, the affected data is purged from the cache and newly retrieved from the cloud service. A conceptual composition of the persistent tile cache 203 is depicted in FIG. 12. The persistent tile cache can be viewed as consisting of two caches, i.e. a tile data cache 401 and a tile metadata cache 402. The caches contain a set of cache records, i.e. tile data cache records and tile metadata cache records. Since a tile of a specific tile version may be present in several maps each with their own unique map version, a tile data cache record has one or more associated tile metadata cache records. The association is represented by the tile id, layer id, and tile version they have in common. The tile metadata cache record includes a metadata that the cloud service calculates over the whole record except the metadata signature. The tile metadata hash is a 64-bit truncated SHA-256 hash and is used by the client frontend for verifying tile metadata.

The client library 202 interacts with the cloud service 14, 18 via HTTPS client 205. The HTTPS client 205 for example authenticates the tile data service 18 and the tile metadata service 14*e*. For example, the client backend 91 may interact with the cloud service over TLS. All messages transmitted between TLS server and TLS client are encrypted and remain private even if intercepted. TLS provides message integrity by calculating a message digest. Certificate chain-based certificate verification enables the TLS client (i.e. the client backend 91) to authenticate the TLS servers (i.e. the map data server and the map metadata server). To retrieve a tile, the HTTPS client does first retrieves the tile metadata from the tile metadata service 14. This metadata includes the URI of the associated tile that, in case the tile is not already present in the persistent tile cache 203, is used to retrieve the tile from the tile data service 18.

Map tiles and map tile metadata are stored in tile data cache records and tile metadata cache records, respectively. Cache records are digitally signed by the cloud service and verified by the tile verifier. Thereby, all content of the persistent tile cache is digitally signed. Digital signature creation and verification is relying on asymmetric cryptography using private encryption keys in the cloud and associated public decryption keys in the vehicle. After successful verification, both the integrity and the authenticity of tile data and tile metadata is assured.

The ASIL-B safety mechanism of the client frontend verifies the integrity of the HD map data that the client provides to the HD map applications. These safety mechanisms operate at the level of arcs (i.e. lane groups and junction areas), arc associated attributes, and nodes. The client backend need not be developed at ASIL-B level, since this level is ensured by the client frontend. Thus, the client backend may be developed in compliance with, e.g., ISO 26262:2018 QM.

The client frontend 92 and backend 91 may both be deployed on the same ECU platform and interact by means of RPC with underlying ECU platform provided IPC. This allows for relying on safe IPC provided by ECU platform OS, i.e. safe communication protocol stacks for inter processor communication are avoided. For instance, both client frontend and client backend may comprise C++ libraries that, linked with other code, are present in associated executables. These executables are deployed on the same ECU platform and interact by means of RPC with underlying ECU platform provided IPC. In that case, sufficient independence of the QM part (the client backend) and the ASIL-B(B) part (the client frontend) can be realized by deploying them on separate processes provided by the underlying ASIL-B compliant ECU platform operating system. The RPC based interaction between frontend and backend relies on safe IPC mechanisms, also provided by the ASIL-B compliant ECU platform. However, this need not be the case and could be on different ECU platforms.

Thus, the present embodiment relates to the implementation of an extended map client for autonomous vehicle applications with enhanced fault resilience. In particular, instead of applying resilience techniques to the entire map client implementation, an extended map client is provided comprising a map client backend 91 and a map client frontend 92 in which the map client frontend 92 (only) is designed with functional safety enhancing techniques. A detailed description of the overall operation of the system according to the present embodiment will now be provided. However, other arrangements would of course be possible.

As described above, the map client frontend 92 has interfaces with a map application (or multiple map applications) and to the map client backend 91. The HD map application interfaces with the map client frontend 91 using a fault resilient map client service interface which comprises the map client service interface extended with a service interface for fault detection, fault reporting and fault diagnostics.

The map client frontend 92 thus provides fault monitoring and it reports any detected faults to the HD map application using the fault resilient map client service interface. The purpose of the map client front end is to detect faults in the map client by verifying the integrity of the data it provides. When a fault is detected in the data from the map client, the map client frontend drops the faulty data and reports a fault the HD map application.

In the present embodiment, the map client frontend 92 uses functional safety data associated with HD road object data generated by the HD map functional safety module 1210 in the map tile compiler 12 of the map server infrastructure. The map tile compiler 12 compiles HD road arcs and HD road nodes (map objects) and then generates the 'functional safety data' over these compiled data structures (map objects).

The map client backend 91 receives, verifies and caches tile data with the HD road object data. However, it does not modify, produce, extend or operate on the HD road object data (arc and node data) or its associated functional safety data. So, the HD road object data and the associated functional safety data as output by the map client should be identical to the data generated in the map server infrastructure.

The map client frontend 92 receives the functional safety data with the HD road object data. If the functional safety data does not correspond with the HD road object data, this indicates that there has been a fault in the map client providing the data. After detecting a fault in the data received from the map client, the map client frontend blocks the data and reports the fault to the HD map application that has requested the data. The HD map application may use the fault report to trigger an appropriate response. Thus, the map client frontend protects the HD map application from faults in the map client module and from faults in the communication paths from the map server to the map client frontend.

The fault detection functionality of the map client frontend is small in comparison with the set of functions of the map client backend. This means that it is suitable for implementation using functional safety engineering techniques. The functional safety implementation of the map client frontend detects and reports all faults of the map client and due to its functional safety engineering implementation also is fault resilient against faults in the map client frontend implementation itself. The combination of the map client and the client frontend is called the extended map client. The extended map client according to the invention consists of a (standard) map client implementation and a functional safety map client frontend implementation. This implementation of the extended map client provides compliance with the functional safety requirements. It achieves this using substantially less resources compared to a functional safety implementation of the map client only.

The extended map client provides a functional safety map client service interface for an HD map application with only a modest increase in resources (hardware, software, storage, energy, development, test, maintenance).

Another benefit of dividing the map client 22 in the manner described above is that the client frontend 92 helps shield the map applications from implementation enhancements in the client backend 91. Variant map client implementations may improve fault resilience using normal development practices, without impacting the functional safety compliance of the extended map client. Due to the structure of the extended map client, the implementation of the map client frontend 92 is independent from the functionality of the map client backend 91. As the functional safety compliance is determined by the map client frontend implementation, any changes to the map client do not impact the functional safety compliance of extended map client.

The map client frontend 92 also may be configured to deal with faults in the map client backend 91 that cause it to not respond (timely) to a request. The map client backend 91 may, for instance, associate a threshold response time with each request from a HD map application and return a time-out fault response to the HD map application when the map client does not respond to the request within the threshold response time associated with the request.

The HTTPS client circuit 205 of the map client backend 91 obtains the data structure tile. The client library circuit 202 of the map client backend 91 first sends the tile to tile verification circuit 204 of the map client backend 91. The tile verification circuit 204 uses the tile signature 703 to verify the authenticity and integrity of a received tile data structure 700. After the tile verification, the client library circuit 202 sends the tile to the persistent tile cache 203 for storing the tile data 702.

The map interface adapter circuit of the map client backend 91 receives requests for HD road object data from an HD map application. It then forwards these requests to the client library circuit. A request can be for an HD road object based on a specific HD road object id, or on a specific location. The result may be that the requested HD road object does not exist, or it returns one or more HD road objects from the persistent tile cache 204. The result of the request is returned to the HD map application via the map client adapter 201. Note that the entire HD road object is returned (i.e. the tuple: HD road object ID, HD road data, functional safety data). In the present embodiment, the map client frontend 92 forwards requests from HD map application and checks the returned HD map objects to detect faults in the map client backend 91. The map client frontend 92 uses the security data 705 for checking the HD map object data 704.

As the map client backend 91 is not involved in any way with the creation or processing of the security data 705, functional faults of the map client backend 91 can be reliably detected in the map client frontend 92.

The system described above thus allows for delivery of map data to the vehicle. In particular, the present embodiments assure safe delivery of HD map data to the vehicle by verifying the integrity and authenticity of at least desired HD road level map data prior to subsequent in-vehicle distribution. (HD map data not associated with the navigable (e.g. road) network e.g. traffic signs, may or may not be verified, depending on the level of functional safety desired.)

For instance, on accepting an HD map data request, the client shall provide HD map data as specified in the request (i.e. the right data) or return an integrity error. On accepting an HD map data request, the client shall either provide the requested HD map data within a specified timeout or immediately after the timeout return a timeout error. In particular, on accepting a HD map data request, the client backend shall then provide to the client frontend HD map data that is equal to the HD map data retrieved from the cloud service (e.g. after checking the authentication and integrity of the data at tile-level) as well as the associated hash values for the map data (i.e. the arcs and nodes). The client frontend then verifies the integrity of the HD map data provided by the client backed using the associated hash data, and once the HD map data has been verified, the client frontend can then provide the requested HD map data to the map-based applications. If the HD map data cannot be verified the client frontend may issue another request for the data, and if verified HD map data is not provided, e.g., within a specified timeout, issue an integrity error.

Map metadata is transferred separately from the map data and protected by hashes too. That is, every lane group and junction area has associated metadata that has its own hash. Metadata includes version and format information.

Figure 13:
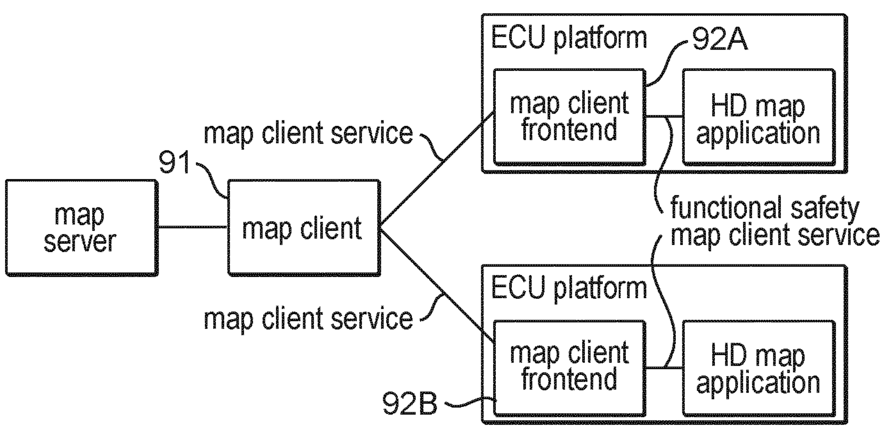
FIG. 13 shows a variant of a map data distribution system in accordance with some embodiments.

Another variant map data distribution system is shown in FIG. 13. This embodiment utilises the approach described above as an in-vehicle HD map distribution system and is an extension of what is described above. Here, a single client backend 91 services multiple client frontends 92A, 92B distributed in the vehicle by means of Remote Procedure Call (RPC). In the vehicle RPC is typically implemented on top of TCP/IP over Ethernet. Relying on secure in-vehicle network communications the system provides the end-to-end (cloud service to in-vehicle HD map application) of HD map data consumed by the HD map application.

Note that this system would transmit more data over the in-vehicle network than for example ADASIS V3 would do. ADASIS V3 was however inspired by ADASIS V2 that needed to be deployed on low bandwidth CAN networks. Both ADASIS V2 and V3 allow fine grain selection of data to be transferred. Ethernet has however much higher bandwidth than CAN such that optimizing for minimum amount of data to transfer is less critical. The client presented above provides an API to do the fine grain selection after transfer and verification of the data.

Figure 14:
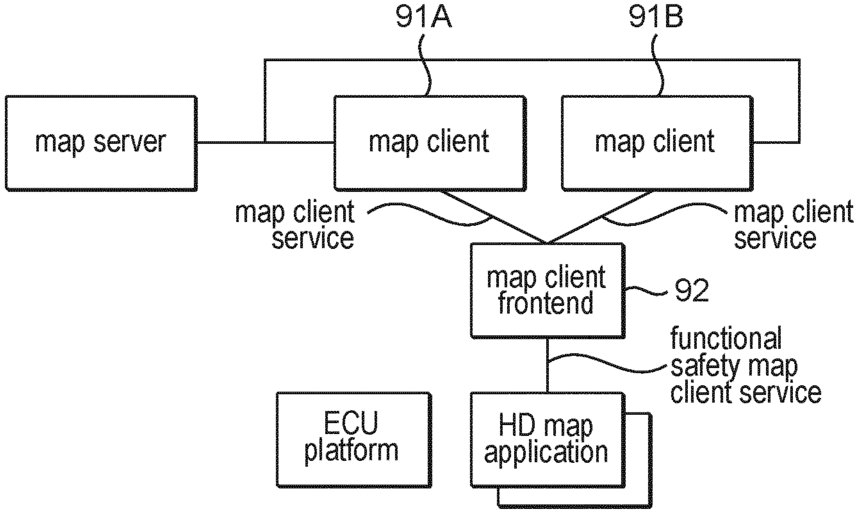
FIG. 14 shows a map client frontend and multiple map clients in accordance with some embodiments.

FIG. 14 shows another example in which a single map frontend 92 is served by multiple map clients (client backends 91A, 91B).

The present embodiments thus provide a HD map delivery system that is safe and includes verifying the integrity/authenticity of HD map data at the level of meaningful entities (such as lane groups and junction areas) before it is delivered to the application. Further, the desired functional safety is achieved in an efficient manner by dividing the map client into a front/backend which can be implemented at different levels of functional safety.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. Thus, the features disclosed in this specification, the figures and/or the claims may be material for the realization of various embodiments, taken in isolation or in various combinations thereof. Furthermore, although the present invention has been described with reference to various embodiments, it will be understood by those skilled in the art that various changes in form and detail may be made without departing from the scope of the invention as set forth in the accompanying claims.

The invention claimed is:

1. A method of handling map data that is being transmitted from a remote server to one or more map-based applications executing on an electronic control unit (ECU) of a vehicle traversing a navigable network covered by a digital map, wherein the digital map is represented as a plurality of map tiles, each map tile representing a particular geographical area including a portion of the navigable network, the method comprising:

generating, at the remote server, a map tile data structure for a map tile, wherein the map tile data structure includes object data indicative of one or more objects falling at least partially within the geographical area represented by the map tile and/or within the geographical area represented by another one or more of the map tiles representing the digital map, the generating comprising including, in the map tile data structure:

security data for at least one object among the one or more objects, the security data being usable for object-level verification to verify an integrity of the object data that is associated with the at least one object and is stored within the map tile data structure; and a digital signature for the map file data structure, the digital signature being usable for tile-level verification to verify an authenticity and/or integrity of the map tile data structure; and transmitting, by the remote server, the map tile data structure from the remote server to a client application executing on the one or more processing units of the vehicle.

2. The method of claim 1, further comprising:

unpacking, by the client application, the map tile data structure to extract the object data indicative of the one or more objects for which data is stored in the map tile data structure; and using, by the client application, the security data to verify the integrity of the extracted object data.

3. A method of operating a client application executing on-board a vehicle traversing a navigable network in a geographical area covered by a digital map, wherein the digital map is represented as a plurality of map tiles, each map tile representing a particular geographical area including a portion of the navigable network, and wherein each map tile has an associated map tile data structure including:

object data indicative of one or more objects falling at least partially within the geographical area represented by the map tile and/or within the geographical area represented by another one or more of the map tiles representing the digital map;

security data usable for object level verification to verify an integrity of the object data associated with at least one object for which object data is stored in the map tile data structure; and a digital signature for the map file data structure and usable for tile-level verification to verify an authenticity and/or integrity of the map tile data structure, the method comprising:

receiving, at the client application, a request from one or more map-based applications for map data relating to one or more features of the navigable network;

obtaining, by the client application, given object data related to the one or more features from a respective map tile data structure;

obtaining, by the client application, from the respective map tile data structure, associated security data for the given object data; and using, by the client application, the security data to verify the integrity of the given object data and, when the integrity of the data is verified, passing the object data to the one or more map-based applications.

4. The method of claim 3, wherein:

the security data useable for verifying the integrity of the given object data includes a hash value for a given object data; and verifying the integrity of the given object data comprises the client application:

recalculating a hash using the given object data to generate a recalculated hash value; and comparing the recalculated hash value with the hash value for the given object data.

5. The method of claim 3, wherein the client application comprises a first application and a second application, the first application being in communication with the one or more map-based applications and the second application being in communication with at least one remote server.

6. The method of claim 5, comprising:

responsive to a request from the one or more map-based applications for information regarding a feature within the navigable network covered by the digital map:

requesting, by the first application from the second application, specified object data associated with the feature;

obtaining, by the second application, the specified object data and associated security data;

providing, by the second application to the first application, the specified object data and the associated security data; and using, by the first application, the associated security data to verify the integrity of the specified object data.

7. The method of claim 6, comprising:

responsive to the first application determining, while verifying the integrity of the specified object data, that the integrity of the specified object data is undamaged:

providing, by the first application to the map-based application, the specified object data.

8. The method of claim 7, comprising:

responsive to the first application determining, while verifying the integrity of the specified object data, that the integrity of the specified object data is damaged:

providing, by the first application to the map-based application, an integrity error message; and/or re-requesting, by the first application from the second application, the specified object data.

9. The method of claim 5, wherein:

the second application comprises a map tile cache storing map tile data structures obtained from the at least one remote server for a plurality of map tiles; and the method comprises:

obtaining, by the second application, particular object data by first checking whether the particular object data is present in the map tile cache, wherein:

when the particular object data is present in the map tile cache, the second application reads the particular object data from the map tile cache; and when the particular object data is not present in the map tile cache, the second application issues a request for the particular object data to the remote server.

10. The method of claim 9, comprising:

verifying, by the second application, the authenticity and/or integrity of the one or more map tile data structures received from the at least one remote server using respective digital signatures before adding the one or more map tile data structures received from the at least one remote server to the map tile cache.

11. The method of claim 3, wherein the map tiles represent the navigable network in respective particular geographical areas as a plurality of arcs connected by nodes, wherein each arc and node of a map tile have object data and security data associated therewith.

12. A method of operating a client application running on one or more processing units of a vehicle traversing a navigable network in a geographical area to provide digital map data from at least one remote server to one or more map-based applications running on an electronic control unit (ECU) of the vehicle, wherein: the client application comprises a first application and a second application, the first application being in communication with the map-based application and the second application, and the second application being in communication with the at least one remote server; the at least one remote server has access to: (i) a map tile data store storing a plurality of map tiles, each map tile representing the navigable network in a portion of the geographical area as a plurality of arcs connected by nodes and each map tile including a digital signature usable for tile-level verification to verify an authenticity and/or integrity of the map tile; and (ii) a map tile metadata data store storing metadata for each of the map tiles in the map tile data store, wherein each arc and node of a map tile have object data and a security data for object level verification to verify an integrity of the object data, the security data including a hash value associated with the object data, the hash value being calculated at the remote server based on at least the object data for the respective arc or node and tile metadata for the map tile containing the object data for the respective arc or node; and the second application comprises: (i) a map tile cache storing a plurality of map tiles obtained from the at least one remote server; and (ii) a map tile metadata cache storing the metadata for each of the map tiles in the map tile cache obtained from the at least one remote server, the method comprising:

receiving, by the first application from the map-based application, a request for digital map data concerning a feature of the navigable network;

requesting, by the first application from the second application, the object data and hash value for the at least one arc or node relating to the digital map data;

obtaining, by the second application, the object data and one or more hash values from the map tile cache or the map tile data store if the map tile is not stored in the map tile cache;

providing, by the second application to the first application, the object data and one or more hash values to the first application;

requesting, by the first application from the second application, the metadata for the map tile concerning the at least one arc or node relating to the digital map data;

obtaining, by the second application, the tile metadata from the map tile metadata cache, or the map tile metadata data store if the required tile metadata is not stored in the map tile metadata cache;

providing, by the second application to the first application, the tile metadata;

calculating, by the first application, a new hash value for the at least one arc or node based on the object data and tile metadata;

comparing, by the first application, the new hash value with the one or more hash values; and providing, by the first application to the map-based application, based on the comparison, either the digital map data or an integrity error message.

13. The method of claim 12, wherein:

the map-based application is an autonomous driving application or is a vehicle horizon provider that in turn provides map data to an autonomous driving application; and upon receiving the integrity error message, the autonomous driving application operates the vehicle in a safe mode and/or brings the vehicle to a safe stop.

14. A method of operating a client application running on one or more processing units of a vehicle traversing a navigable network in a geographical area to provide digital map data from at least one remote server to one or more map-based applications running on an electronic control unit (ECU) of the vehicle, wherein: the client application comprises a first application running on the ECU and a second application, the first application being in communication with the map-based application and the second application, and the second application being in communication with the at least one remote server; the at least one remote server has access to a map tile data store storing a plurality of map tiles, each map tile representing the navigable network in a portion of the geographical area as a plurality of arcs connected by nodes, wherein each arc and node of a map tile have object data associated therewith, wherein each map tile is associated with a digital signature usable for tile-level verification to verify an authenticity and/or integrity of the map tile, and wherein some or all of the object data for some or all of the arcs and/or nodes in the map tile is associated with security data usable for object-level verification to verify an integrity of the object data; and the second application comprises a map tile cache storing a plurality of map tiles obtained from the at least one remote server, the method comprising:

receiving, by the first application, a request from the map-based application for digital map data concerning a feature of the navigable network;

requesting, by the first application from the second application, the object data for the at least one arc or node relating to the digital map data;

obtaining, by the second application, the object data, wherein the object data is either obtained from the map tile cache if the object data is present in the map tile cache or from the map tile data store if the map tile associated with the object data is not present in the map tile cache;

providing, by the second application to the first application, the object data;

identifying, by the first application, a portion of the object data corresponding to the feature of the navigable network; and providing, by the first application, the requested digital map data to the map-based application using the portion of the object data.

15. The method of claim 14, wherein the second application is developed according to a lower functional safety standard than the first application.

16. The method of claim 15, wherein the first application is developed at least according to an ISO 26262:2018 ASIL-B functional safety standard.

17. The method of claim 16, wherein the first application is implemented redundantly.

18. The method of claim 17, wherein the first application is executed on a same one or more processing units of the vehicle as the map-based application.

19. The method of claim 18, wherein the one or more processing units of the vehicle comprise an electronic control unit (ECU) of the vehicle.

20. The method of claim 1, wherein the security data is a hash associated with the object data of the at least one object and is calculated based on both the object data of the at least one object and metadata for the map tile containing the object data of the at least one object.

* * * * *